(12) United States Patent
Leicher et al.

(10) Patent No.: US 9,467,429 B2
(45) Date of Patent: Oct. 11, 2016

(54) IDENTITY MANAGEMENT WITH GENERIC BOOTSTRAPPING ARCHITECTURE

(71) Applicant: INTERDIGITAL PATENT HOLDINGS, INC., Wilmington (DE)

(72) Inventors: Andreas Leicher, Frankfurt (DE); Vinod K. Choyi, Norristown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/441,577

(22) PCT Filed: Nov. 8, 2013

(86) PCT No.: PCT/US2013/069250
§ 371 (c)(1),
(2) Date: May 8, 2015

(87) PCT Pub. No.: WO2014/004664
PCT Pub. Date: Jan. 3, 2014

(65) Prior Publication Data
US 2015/0295905 A1    Oct. 15, 2015

Related U.S. Application Data

(60) Provisional application No. 61/724,762, filed on Nov. 9, 2012.

(51) Int. Cl.
*G06F 21/00* (2013.01)
*H04L 29/06* (2006.01)
*H04W 12/06* (2009.01)

(52) U.S. Cl.
CPC ............. *H04L 63/061* (2013.01); *H04L 63/08* (2013.01); *H04W 12/06* (2013.01)

(58) Field of Classification Search
CPC ........................... H04L 63/0815; H04L 63/08
See application file for complete search history.

(56) References Cited

U.S. PATENT DOCUMENTS

| | | | | |
|---|---|---|---|---|
| 8,914,636 B2* | 12/2014 | Cha | ...................... | H04L 63/0815 713/171 |
| 2006/0236382 A1* | 10/2006 | Hinton | ................ | H04L 63/0815 726/8 |
| 2011/0258447 A1* | 10/2011 | Wei | ...................... | H04L 63/0869 713/168 |
| 2011/0271330 A1* | 11/2011 | Zhang | ................. | H04L 63/0838 726/5 |
| 2012/0102315 A1* | 4/2012 | Holtmanns | ............. | H04L 63/06 713/150 |

(Continued)

OTHER PUBLICATIONS

3rd Generation Partnership Project; (3GPP) TR 33.924 V11.0.0; 3rd Generation Partnership Project; Technical Specification Group Services and System Aspects; Identity management and 3GPP Security Interworking; Identity management and Generic Authentication Architecture (GAA) interworking, (Release 11), Sep. 2012, 40 pages.

(Continued)

*Primary Examiner* — Morshed Mehedi
(74) *Attorney, Agent, or Firm* — Baker & Hostetler LLP

(57) ABSTRACT

A federated management identity protocol may be used with various protocols such as, for example, the Generic Bootstrapping Architecture (GBA). For example, OpenID Connect may be integrated with GBA such that the GBA protocol implements the authentication functionality of OpenID Connect. In various example embodiments, functionality of the OpenID Connect protocol and GBA may be implemented locally, such as by a secure module within a user equipment.

18 Claims, 10 Drawing Sheets

(56) References Cited

U.S. PATENT DOCUMENTS

| | | | |
|---|---|---|---|
| 2012/0226611 A1* | 9/2012 | Radia | G06Q 20/02 705/44 |
| 2014/0201809 A1* | 7/2014 | Choyi | H04L 63/0807 726/3 |

OTHER PUBLICATIONS

3rd Generation Partnership Project; (3GPP) TS 24.109 V12.1.0; 3rd Generation Partnership Project; Technical Specification Group Core Network and Terminals; Bootstrapping interface (Ub) and Network Application Function Interface (Ua); Protocol details, (Release 12), Jun. 2013, 77 pages.

3rd Generation Partnership Project; (3GPP) TS 33.220 V12.1.0; 3rd Generation Partnership Project; Technical Specification Group Services and System Aspects; Generic Authentication Architecture (GAA); Generic Bootstrapping Architecture (GBA), (Release 12), Jun. 2013, 92 pages.

3rd Generation Partnership Project; (3GPP) TS 33.222 V12.2.0; 3rd Generation Partnership Project; Technical Specification Group Services and System Aspects; Generic Authentication Architecture (GAA); Access to network application functions using Hypertext Transfer Protocol over Transport Layer Security (HTTPS), (Release 12), Jun. 2013, 35 pages.

de Medeiros, "OpenID Connect Session Management 1.0—draft 25", Aug. 3, 2015, 15 pages.

Hardt, D., "The OAuth 2.0 Authorization Framework draft-ietf-oauth-v2-31", Jul. 31, 2012, 49 pages.

Jones et al, "JSON Web Signature (JWS)", Internet Engineering Task Force (IETF), RFC #7515, May 2015, 42 pages.

Jones et al, "JSON Web Token (JWT)", Internet Engineering Task Force (IETF), RFC #7519, May 2015, 21 pages.

Jones, M. and Hildebrand, J., "JSON Web Encryption (JWE)", Internet Engineering Task Force (IETF), RFC#7516, May 2015, 37 pages.

Jones, M., "JSON Web Key (JWK)", Internet Engineering Task Force (IETF), RFC# 7517, May 2015, 29 pages.

Jones, M., "Simple Web Discovery (SWD) draft-Jones-Simple-Web-Discovery-04", Nov. 12, 2012, 6 pages.

Sakimura et al, "OpenID Connect Core 1.0 Incorporating Errata Set 1", Nov. 8, 2014, 93 pages.

Sakimura et al, "OpenID Connect Discovery 1.0 Incorporating Errata Set", Nov. 8, 2014, 20 pages.

Sakimura et al, "OpenID Connect Dynamic Client Registration 1.0 Incorporating Errata Set 1", Nov. 8, 2014, 20 pages.

Sakimura et al, "OpenID Connect Messages 1.0—draft 20", Jul. 5, 2013, 70 pages.

Sakimura et al, OpenID Connect Basic Client Implementers Guide 1.0—draft 36, Nov. 8, 2014, 36 pages.

* cited by examiner

IDENTITY MANAGEMENT WITH GENERIC BOOTSTRAPPING ARCHITECTURE

CROSS-REFERENCE TO RELATED APPLICATIONS

This application is the National Stage of International Application No. PCT/US2013/069250 filed Nov. 8, 2013, which claims the benefit of and priority to U.S. Provisional Application No. 61/724,762, filed Nov. 9, 2012, the entireties of both applications are incorporated herein by reference for any and all purposes.

BACKGROUND

Wireless telecommunications may implement various forms of authentication. There are a variety of user and device authentication protocols that utilize a similar network architecture that includes a user equipment (UE), a service provider (SP), and an authentication end point (AEP). For example, a UE may communicate with an SP, such as a website for example, to access a service. The SP may require that the UE is authenticated before allowing the UE to access the service. The AEP may authenticate the UE for the SP.

A federated identity management architecture, such as the OpenID or OpenID Connect protocols, may be implemented with a UE, SP, and an AEP as described above. The OpenID protocols, for example, may authenticate a UE using various authentication protocols such as the generic bootstrapping architecture (GBA). Existing approaches to authentication have not efficiently integrated identity management protocols, such as OpenID Connect for example, with GBA.

SUMMARY

Systems, methods and apparatus embodiments are described herein for integrating generic bootstrapping architecture (GBA) authentication with identity management protocols, such as OpenID Connect for example. In an example embodiment, a system comprises a user equipment (UE), a service provider (SP), and an authentication endpoint (AEP) that communicate with each other via a network. The SP may be referred to as a client or a relying party (RP). The AEP may comprise a network access function (NAF) and an OpenID identity provider (OP) that are co-located with each other, and thus the AEP may be referred to as a NAF/OP. Alternatively, the NAF and OP may be located separately from each other and maybe capable of communicating with each other. The UE may request access to a service that is provided by the SP. In response to requesting access to the service, the UE may receive a request for a token. For example, the UE may receive a request for an identity (ID) token and/or an access token in accordance with the OpenID Connect protocol. The UE may receive a request or a challenge that requests that the UE use a generic bootstrapping architecture (GBA) protocol for authentication of the UE. In response to the request for the token, the UE may create an identity (ID) token. The UE may sign the ID token using a token key that is derived in accordance with the GBA protocol, thereby creating a signature of the ID token, wherein the signature may be verified to provide the UE access to the requested service. The ID token may include a header indicating that the ID token was created locally at the UE. In an example embodiment, the token key is derived from a master session key that is bootstrapped in accordance with the GBA protocol. Thus, the token key may be an application specific key. Alternatively, an authentication digest may be calculated in accordance with the GBA protocol. The calculated authentication digest may be used as the token key. In another embodiment, an application specific key may be calculated from a master session key that is bootstrapped in accordance with the GBA protocol. When the application specific key is calculated correctly, for example, the token key may be retrieved from a module that resides within the UE. For example, the token key may be a private key with a corresponding public key that is available to the AEP. In yet another embodiment, a first key may be derived from a master session key that is bootstrapped in accordance with the GBA protocol, wherein the first key is an application specific key. The UE may generate a random seed value. The UE may derive a key pair from the application specific key and the random seed value. The key pair may include a private key and a public key, wherein the private key is the token key.

In another example embodiment, the UE may provision an access token that is associated with a SP, such as relying party (RP) for example. The UE may generate the access token in response to receiving a request for local token generation. The access token may comprise information about the location of a user information endpoint. The user information endpoint may provide user data to the SP upon verification of the access token. For example, the user information endpoint may be located on a secure module within the UE. Alternatively, the user information endpoint may be located on a network entity that communicates with the SP. In yet another example, the user information endpoint may be located on both the UE and on the network or cloud. For example, a class of confidential data may be located on a secure module within the UE, and a class of nonconfidential data may be located on a network entity that communicates with the SP.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
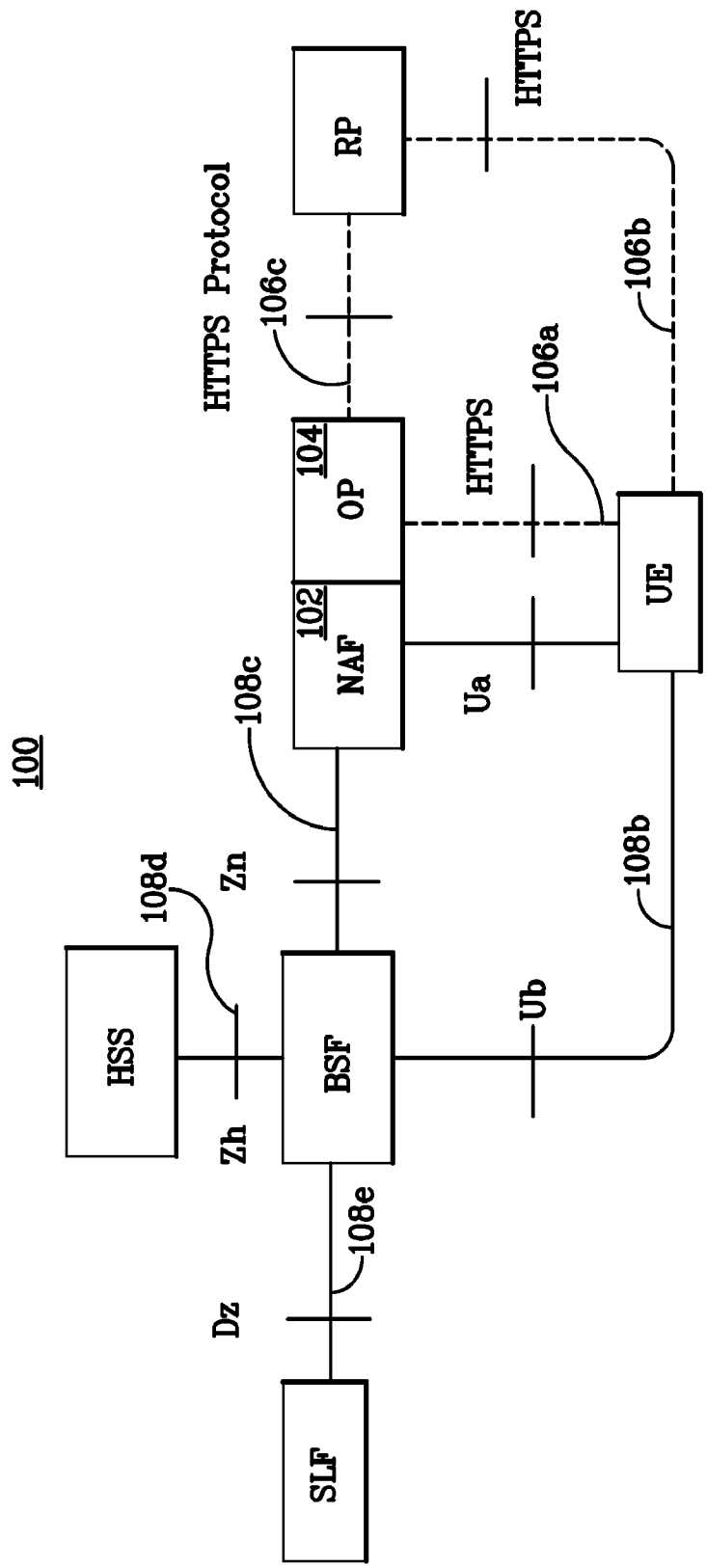
FIG. 1 is a block diagram of an example architecture implementing an OpenID protocol and a generic bootstrapping architecture (GBA) protocol.

The ensuing detailed description is provided to illustrate example embodiments and is not intended to limit the scope, applicability, or configuration of the invention. Various changes may be made in the function and arrangement of elements and steps without departing from the spirit and scope of the invention.

Embodiments are described herein that combine the generic bootstrapping architecture (GBA) with identity management protocols, such as OpenID Connect for example. For exemplary purposes, embodiments described herein are described with reference to the OpenID Connect protocol, but the embodiments are not limited to implementing the OpenID Connect protocol, and may implement other identity management and single sign-on (SSO) protocols for example. In one example embodiment described herein, the authentication mechanism of OpenID Connect is implemented using a GBA authentication. Various other embodiments described herein enable OpenID Connect functionality to be implemented locally on a user equipment (UE), such as by using a local OpenID Identity Provider (OP), described below.

As used herein, unless otherwise stated, Local OpenID refers to a subset of Local Mobile SSO implementations whereby the implementation of SSO and/or identity management is based on an OpenID protocol. For example, Local OpenID may indicate the functions of an OpenID Identity Provider (OP or OpenID IdP) are performed by a locally located entity or module. Thus, as used herein, a Local OP refers to an entity or module that performs at least some, for instance all, functions of an OpenID server locally on a device. In an example implementation of a Local OP, only a subset of the OP functionality is performed locally while other functions of the OP are performed on a server. One of the implementations of a local OP facilitates authentication of the user and/or the device through local token creation and creation of local signatures of tokens. The creation of the token signature may be based on GBA credentials. For example, GBA credentials, or keys derived from GBA, may be used as signing material for OpenID Connect tokens. As used herein, a key used to sign a token may be referred to as a token key. The local OP may also authorize and transport locally stored user data. Locally stored data may refer to data that is stored on a secure module within a UE. For example, a user may deem data particularly sensitive and that data may be stored locally. An example local OP is further described in U.S. patent application Ser. No. 13/237,344, which is incorporated by reference as if set forth in its entirety herein.

As used herein, unless otherwise stated, the terms relying party (RP) and client refer to a service provider (SP), such as a service website for example. The terms OpenID identity provider (OP) and authorization server refer to an identity provider (IdP). Further, an IdP may also be referred to as an authentication endpoint (AEP). Further, the IdP may refer to an entity that is capable of delegating AEP functionality to one or more other entities that reside on the UE or on the network. The terms browser agent (BA) and browser may refer to an application that a user or UE uses to access the SP (e.g., website/portal). The OpenID Connect protocol may be referred to as OIDC.

Referring to FIG. 1, a block diagram illustrates a system 100 that depicts one straightforward integration example of GBA and OpenID Connect. The illustrated system 100 includes a network access function (NAF) 102 and an OP 104 that are co-located with each other. Referring to FIG. 1, the interfaces 106a-c are associated with the OpenID Connect protocol, and the interfaces 108a-e are associated with an example GBA infrastructure. Such interfaces are further described in 3GPP TR 33.924, Identity management and 3GPP security interworking, Identity management and Generic Authentication Architecture (GAA) interworking; 3GPP TS 24.109, 3GPP TS 33.220, Bootstrapping interface (Ub) and network application function interface (Ua), Protocol details; and 3GPP TS 33.222, Generic Authentication Architecture (GAA), Access to network application functions using Hypertext Transfer Protocol over Transport Layer Security (HTTPS), the disclosures of which are hereby incorporated by references as if set forth in their respective entireties herein.

Figure 2:
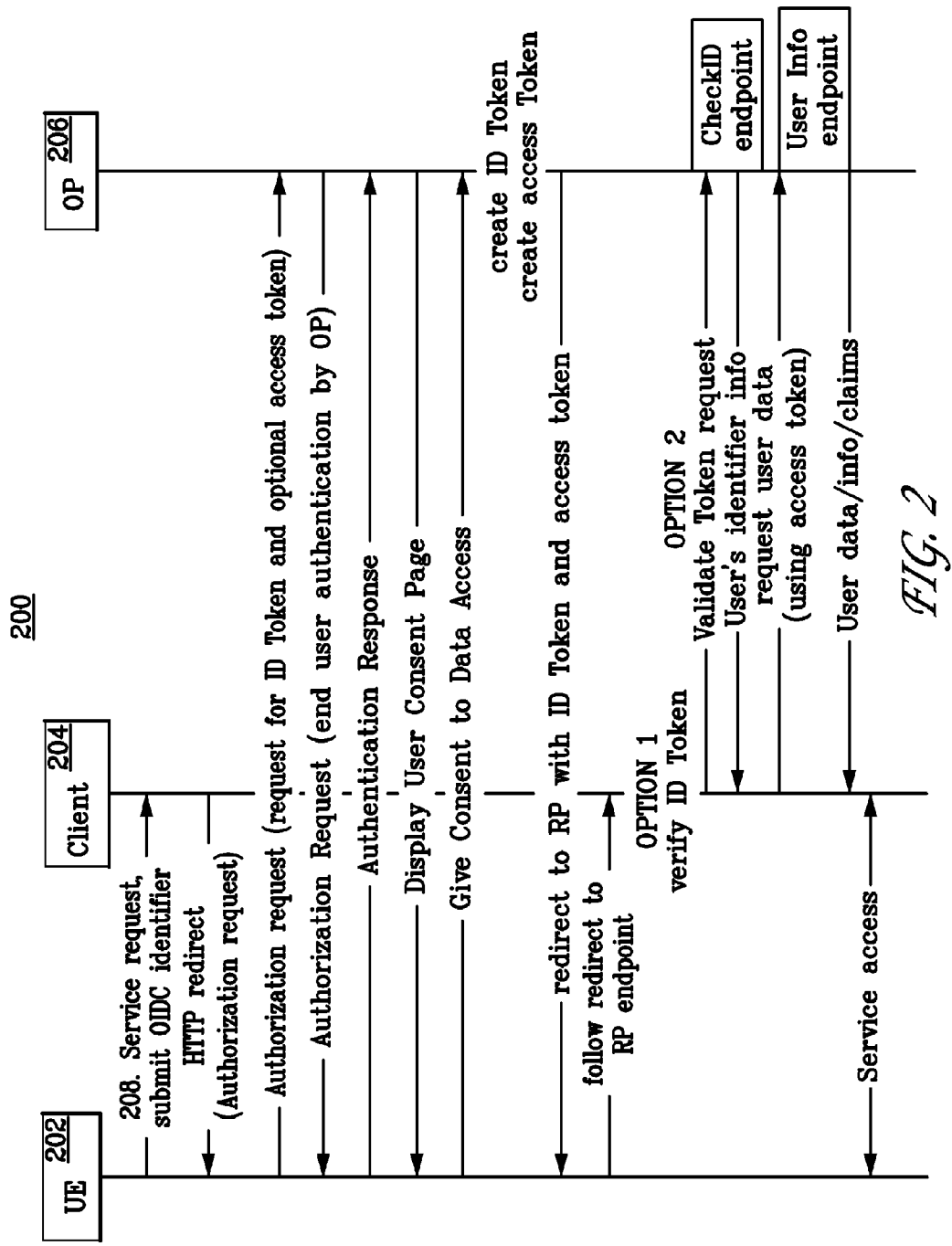
FIG. 2 is a flow diagram of an example OpenID Connect protocol flow.

Referring to the example call flow shown in FIG. 2, a system 200 includes a UE 202, a client 204, and an OpenID Identity Provider (OP) 206. At 208, a user of the UE 202 may use a browser on the UE 202 to browse to a service website that offers a service that the user wants to access. Alternatively, at 208, the user may use an application that is not a browser. FIG. 2 shows an example OpenID Connect flow and is included herein for reference. The protocol flow illustrated in FIG. 2 may be referred to as an example generic OpenID Connect Protocol flow.

Figure 3:
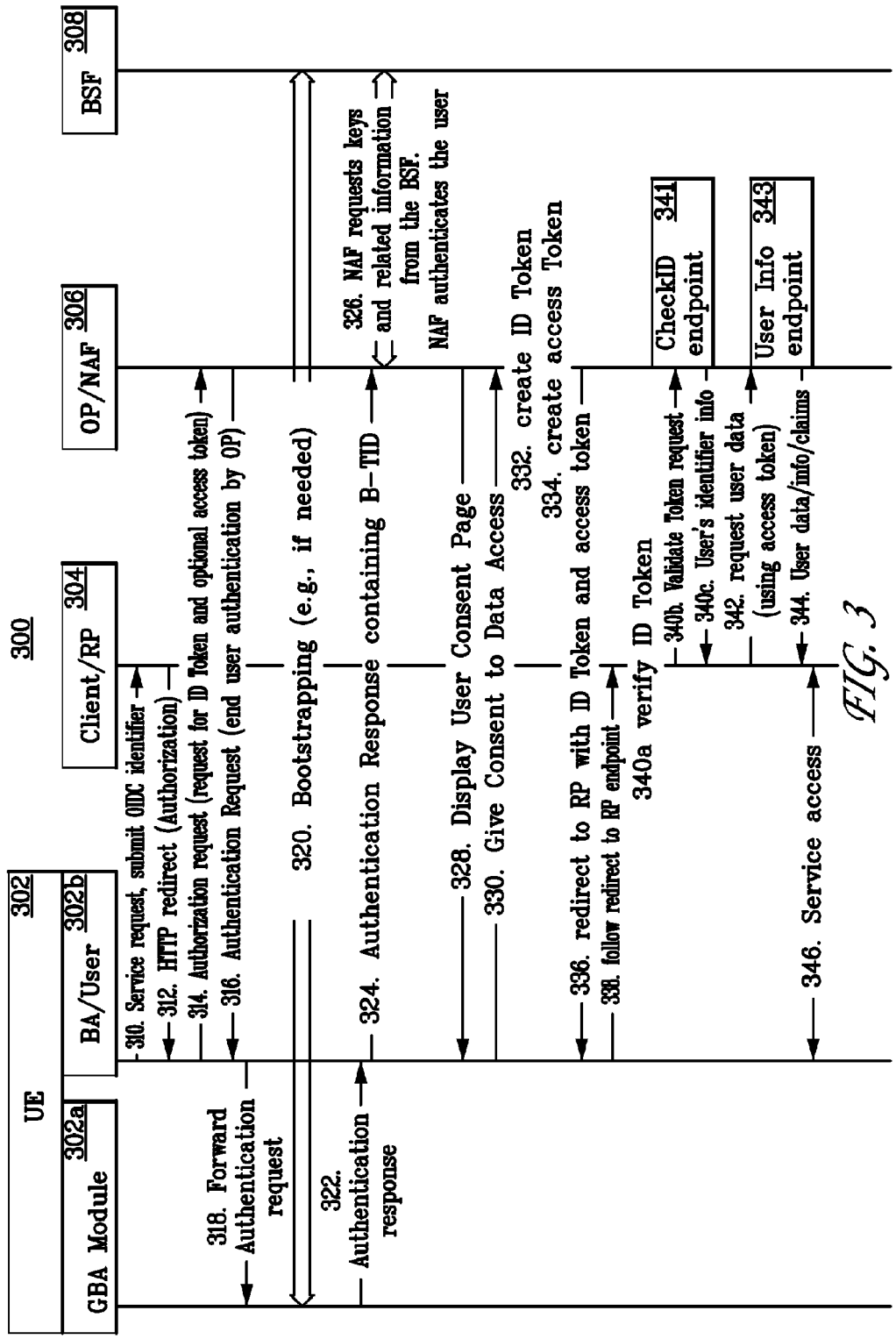
FIG. 3 is a flow diagram of an OpenID Connect protocol flow with GBA authentication according to an example embodiment.

Referring to the illustrated embodiment shown in FIG. 3, a system 300 includes a UE 302, a client 304, an OP/NAF 306, and a bootstrapping server function (BSF) 308 that communicate with each other via a network. The client 304 may also be referred to as an RP 304. FIG. 3 shows an example protocol flow for OpenID Connect in which an OP and NAF are co-located, and thus the OP and NAF can be referred to as the OP/NAF 306. In accordance with an alternative example implementation, the OP and NAF are not co-located, but are capable of communicating to one another in a secure manner. Further, in accordance with the illustrated embodiment, authentication of a user of the UE 302 takes place via GBA, and the UE 302 includes a GBA module 302a and a browser agent (BA) 302b. The user of the UE 302 may use the BA 302 to communicate with the network, and thus the BA 302b may also be referred to as the BA/user 302b. It will be understood that the illustrated functions of the GBA module 302a may be performed by an applet within a universal integrated circuit card (UICC) that executes GBA functions, or by any other module within the UE 302 as desired in a secure manner.

In an example embodiment, the RP 304 presents to the BA/user 302b a form field where the user may enter his OpenID Connect identifier, for example, to initiate OpenID Connect authentication. Based on the identifier, the RP can identify an OP, such as the OP 306 for example, that is responsible for user authentication. This process may be referred to as discovery and may result in the RP 304 being informed of a URL of the OP 306 and its endpoints. During discovery, the RP 304 may also attain information associated with keys for verification of tokens from the OP 306. For example, in contrast to OpenID 2.0, discovery may take place once between the RP 304 and the OP 306, as opposed to a discovery process for every user. Referring to the illustrated embodiment shown in FIG. 3, at 310, it may be assumed that the RP 304 has previously successfully performed discovery and stored the relevant data so that it is now re-using that information.

Still referring to FIG. 3, at 310, the BA 302b sends the user identifier to the RP 304, for example, to request access to a service that is provided by the RP 304. At 312, the RP 304 may build an authorization request and may redirect the BA 302b to the OP 306 with the authorization request. Such an authorization request may be built in accordance with OpenID Connect for example. At 314, in accordance with the illustrated embodiment, the BA 302b follows the redirect and sends an HTTP GET request to the OP 306. At 316, the OP/NAF 306 initiates the UE/User authentication by responding with a HTTP 401 'unauthorized' message. Such a message may comprise, in the WWW Authenticate header for example, a challenge that requests that the UE 302 use GBA authentication. Such a message may be constructed in accordance with 3GPP TS 33.222, 3GPP TS 33.220, or TR 33.924 for example. For example, in the WWW Authenticate header, the message may contain a challenge requesting that the UE 302 uses the specified GBA protocol for authentication. The GBA-type authentication protocols comprise both non-UICC based, such as SIP Digest for example, and UICC based protocols. The UE 302 and the OP/NAF 306 may negotiate which GBA type is acceptable, for example, according to a policy of the RP 304 and/or a policy of the network. Examples of negotiation and selection of authentication protocols are further described in U.S. patent application Ser. No. 13/535,563, the disclosure of which is hereby incorporated by reference as if set forth in its entirety herein.

At 318, a function in the BA 302b (e.g., a JavaScript, a Java applet, a browser plugin, or the like) may send the Digest challenge parameters to the GBA module 302a. If no valid master session key (Ks) is available, for example, the GBA module may bootstrap with the network bootstrapping server function (BSF) 308, at 320. It will be understood that the bootstrapping may be performed in accordance with 3GPP TS 33.220, for example, and may result in the Ks being available in the UE 302. From the Ks the application specific key (Ks_(ext/int)_NAF) may be derived. In an example embodiment, in a single NAF/OP combination the same Ks_NAF may be used for all authentication attempts within the key's lifetime. At 322, the GBA module 302a passes the digest result to the BA 302b. At 324, the BA 302b may generate an HTTP(S) GET request for the OP/NAF 306, where the authorization header may comprise the digest as calculated and the bootstrapping transaction identifier (B-TID) as received from the BSF 308 during the bootstrapping phase at 320. At 326, the NAF 306 may request the application specific NAF key from the BSF 308, using the B-TID and an identity of the NAF (NAF_ID) for example. The OP/NAF 306 may use this data to authenticate the user. For example, it will be understood that the user may be authenticated in accordance with 3GPP TS 33.222. At 328, the OP/NAF 306 may display a consent page to the user. At 330, the user may grant or deny access to the data fields that are requested by the RP 304. The user may provide consent to the OP to release certain data fields and may deny the request to provide certain other data fields to the Client/RP 304.

In accordance with the illustrated embodiment, at 332 the OP 306 creates an identity (ID) Token. It will be understood that the ID token may be created in accordance with the OpenID Connect Basic Client Profile specification 1.0. At 334, the OP/NAF 306 creates a valid access token for the RP 304. Such an access token may be requested by the Client/RP 304 in the Authorization request and approved by the user. At 336, the OP/NAF 306 may redirect the BA 302b to an RP endpoint URL that may have been given by the RP 304 during discovery. The ID token may be included in the HTTP redirect message, and the access token may be included in the HTTP redirect message, for example, if the access token was requested. The ID token may be tied to each RP via audience and nonce claims within it. At 338, following the redirect, the token(s) may be sent to the RP endpoint.

In one example scenario, the RP 304 may want to verify the ID Token signature itself. In such a scenario, at 340a, the RP 304 checks the signature on the token using the appropriate key (e.g., using the client secret if HMAC signature was used or using the certificate provided in the x5u parameter) that was established between the RP 304 and OP/NAF 306 during the current Discovery and Association phase or from a previous Association phase. If the RP 304 did not request an access token, for example, the process may proceed to step 346. If the RP 304 did request and receive an access token, for example, the process may continue to step 342.

In another example scenario, at 340b, the RP 304 does not verify the ID token by itself. For example, at 340b, the RP may contact a Check ID endpoint 341 of the OP/NAF 306 with the ID Token. This communication may be protected by the use of a client secret that is shared between the RP 304 and the OP 306. Such a client secret may have been established during discovery/registration. At 340, the Check ID endpoint 341 may return the verification result to the RP 304. In an example scenario in which the RP 304 does not request an access token, the process may proceed to step 346. If the RP did request and receive an access token, the process may continue to step 342.

At 342, in accordance with the illustrated embodiment, the client 304 authenticates towards a user information (info) endpoint 343 at the OP/NAF 306, for example, by using the client secret (e.g., established during discovery/registration) and the client 34 may send the access token in a request for user data. At 344, the user info endpoint 343 may return the requested user data (e.g., nickname, address, date of birth, etc.). At 346, the BA/user 302b accesses the service that is provided by the RP 304.

As a means for setting up a secure channel between the UE 302 and the client/RP 304, a special token may be created. Such a token may be created in addition to the ID and access tokens (see steps 332 and 334). The token may be for the RP 304 to request keying material that is created during GBA bootstrapping, from the OP/NAF key endpoint. Such keying information may be shared with the UE 302 that was directly involved in the bootstrap process. The keying material may be the keys themselves that are shared with the UE 302 and/or the RP 304. Alternatively, the keying material may include material (e.g., nonces, random values, text, etc.) that is provided to the UE 302 and/or the RP 304, which may be used to derive keys to secure the communication between UE 302 and the Client/RP 304. This secure channel process may also apply to other embodiments described herein.

With respect to creating tokens in OpenID Connect, example signatures on the tokens include valid JSON Web Token Signatures. For example, JWS is further described in JSON Web Token (JWT) and JSON Web Signature (JWS) specifications referenced herein. For example, a signed token using JWS may have a header which comprises information on the signature algorithm and may comprise pointers to the keys being used for the signature. The signature algorithm for the JWS may include one of the following example algorithms:

(1) HS256 HMAC using SHA-256 hash algorithm
(2) HS384 HMAC using SHA-384 hash algorithm (3) HS512 HMAC using SHA-512 hash algorithm
(4) RS256 RSA using SHA-256 hash algorithm
(5) RS384 RSA using SHA-384 hash algorithm
(6) RS512 RSA using SHA-512 hash algorithm
(7) ES256 ECDSA using P-256 curve and SHA-256 hash algorithm
(8) ES384 ECDSA using P-384 curve and SHA-384 hash algorithm
(9) ES512 ECDSA using P-521 curve and SHA-512 hash algorithm As shown above, different key types may be supported based on the selected signature algorithm. Because the RP may choose to verify the signature (e.g., on the ID token) itself, the RP may need to know the verification keys. The pointer to the keys may be part of the header. This pointer may be the jku (JSON Web Key URL) parameter, which comprises a URL pointing to a set of JSON encoded public keys. The x5u parameter may comprise an URL pointing to a X.509 public key certificate or certificate chain corresponding to the key. The header parameters may be set by the entity creating the token and the token signature.

In an example embodiment, the HMAC signature is used and the client secret is used as the signature key in accordance with the OpenID Connect protocol. The client secret may be established between the RP and the OP (e.g., registration endpoint at OP) during the registration. Such a registration need not be performed on every user authentication. For example, such a registration may be performed when the RP decides to enable support for this specific OP and may be periodically refreshed to generate a newer client secret.

In an example embodiment, the tokens in OpenID Connect may be implemented in a split terminal scenario. An example split terminal scenario is further described in 3GPP TR 33.924.

Various embodiments described herein implement OpenID Connect and GBA in a manner in which various OP functions are executed locally. The UE may perform various functions locally. For example, authentication may be executed locally. Authentication tokens may be created and/or signed locally. An authorization function and a transport mechanism may be implemented locally. Such a transport mechanism may facilitate the transmission of locally stored user data information elements, such as information bearing tokens for example. In one embodiment, a token is locally signed that enables access to information elements that are held by a network entity. It will be understood that the aforementioned local implementations of functions may be combined or be may be implemented separately. For example, a token or tokens may be created on the device, and the token(s) may enable delivery of some information elements that reside on the device and some information elements that reside in the network, or a combination thereof, according to an example embodiment.

Referring generally to the illustrated embodiments shown in FIGS. 4-7, systems 400, 500, 600, and 700 each include a UE 502, a Client/RP 504, an OP/NAF 506, and a bootstrapping server function (BSF) 508 that communicate with each other via a network. Unless otherwise noted, common reference numbers among the Figures should be understood to refer to similar features. The client 504 may also be referred to as an RP 504 or a client/RP 504 without limitation. It will be understood that the client/RP may also be referred to as service provider without limitation. Further, the OP 506 and the NAF 506 may be co-located with each other, and thus they may be referred to as the OP/NAF 506. Alternatively, the OP and the NAF may be located separately and may be capable of communicating with each other in a secure manner. The OP/NAF 506 may be an authentication endpoint (AEP). The illustrated UE 502 includes a browser agent (BA) 502b and an extended GBA (eGBA) module 502a. The eGBA module 502a may perform functions in addition to GBA specific tasks. For example, the eGBA module 502a may perform the functions of a GBA module, such as bootstrapping with the BSF 508 and derivation of Ks_NAF keys from Ks, and it may perform functions such as key derivation, token creation, token signature, or the like. For example, functionality of the eGBA module 502a may support protocols such as OpenID Connect. In an example embodiment the eGBA module 502a may only perform GBA related functions including bootstrapping and derivation of NAF related keys such as Ks_(int/ext)_NAF for example. The NAF related keys may be then provided to another application that is stored securely within the same UE 502. The other application may perform derive keys, create tokens, and sign tokens. The application may reside on the eGBA module 502a, on another secure module, on a trusted execution zone, or a combination thereof.

In an example embodiment, the functions inside the eGBA module 502b are secured from modifications by a user of the UE 502. The functions of the eGBA module 502a functions may be implemented on an UICC or in the UE 502. Alternatively, eGBA functions may be implemented outside an GBA module, such as in a secure environment that is able to communicate with the GBA module for example.

There are several example scenarios described herein for creating local tokens and creating local signatures of tokens. In one example embodiment, the Ks_NAF keys are used to create token signatures locally. This embodiment is further described below with reference to FIG. 4 For example, a verification of the ID token signature at the RP 504 might not occur because, for example, the Ks_NAF is not shared with the RP 504. In such a situation, the RP 504 may use a check ID endpoint 527 of the OP/NAF 506 for token verification. Because the Ks_NAF is a symmetric key, an HMAC signature algorithm may be used. Such a signature may be created using the client secret. For example, the RP 504 may use the check ID endpoint 527 for token verification in this situation instead of verifying the token itself. The check ID endpoint 527 may be used for verification because it may be operated by the OP/NAF 506, which can use the Ks_NAF key for signature verification.

In another example embodiment, pre-installed public/private key pairs are used. For example, the eGBA module 502a may unlock the private key, as further described below. Certificates comprising the public keys may be stored and provided by the OP/NAF 506. The private keys may be stored in the eGBA module 502a and may be released for use if a GBA run has been performed successfully. The OP/NAF 506 or another entity may serve as a certification authority in this context. Alternatively, dynamic URLs may be used to unlock the private key, as further described below.

In yet another example embodiment, keys are used that are derived from Ks_NAF keys, as further described below with reference to FIG. 5. For example, dynamic URLs may be used at the OP/NAF 506. For example, the eGBA module 502a may generate new keys based on the Ks_NAF keys (or based on the GBA digest) and a random seed string. The OP/NAF 506 may be in possession of the same key material as has been derived on the UE 502 in the eGBA module 502a, so the random seed string may be passed to the OP/NAF 506 as part of the URL that the RP 504 may query for retrieval of the public key.

Figure 4:
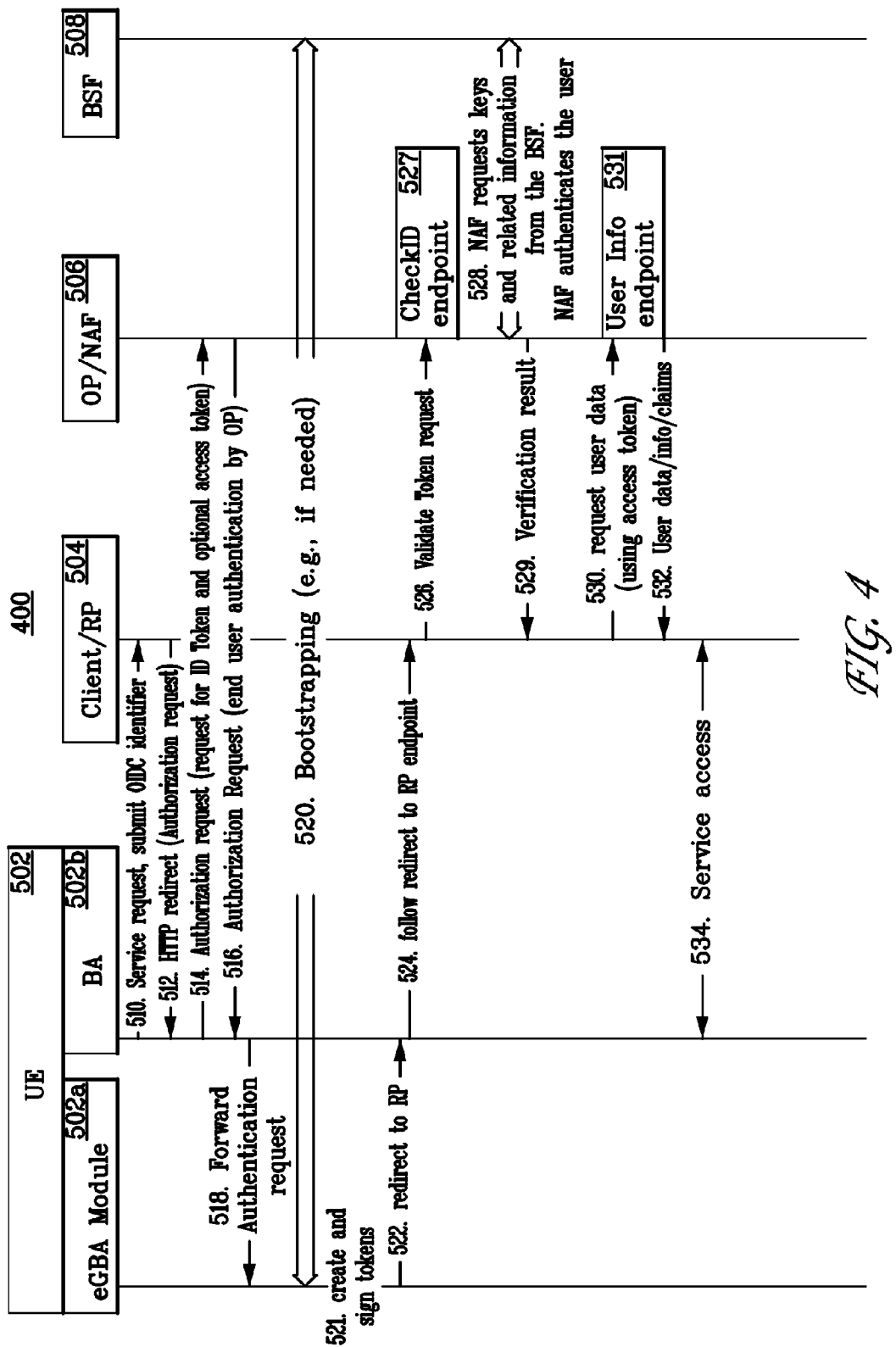
FIG. 4 is a flow diagram of an OpenID Connect protocol flow with GBA authentication to create token signatures according to an example embodiment.

With particular reference to the illustrated embodiment shown in FIG. 4, at 510, the BA 502b sends a user identifier to the RP 504, for example, to request access to a service that is provided by the RP 504. At 512, the RP 504 may build an authorization request and may redirect the BA 502b to the OP 506 with the authorization request. At 514, the BA 502b may follow the redirect and send a HTTP GET request to the OP 506. At 516, the OP/NAF 506 may initiate the UE/User authentication by responding with an HTTP 401 'unauthorized' message. Such a message may comprise, in the WWW Authenticate header for example, a challenge that requests that the UE 502 use GBA authentication. The request may further include an indicator that local token generation be performed. The request may further include keying material or a request that public/private keys should be used. It will be understood that the request message may be constructed in accordance with 3GPP TS 33.222. At 518, the BA 502b may send the Digest challenge parameters and an indicator to the eGBA module 502a. Such an indicator may indicate that local token generation and signature should be used. If an access token is requested, a JavaScript function, for example, may request user permission/authorization, and then may pass the user permission/authorization information to the eGBA module 502a. Such information may enable the eGBA module 502a to create ID tokens and access tokens. In an example embodiment, the actual authentication of the user of the UE 502 may be done by requesting the user to enter a PIN, for example, to unlock functionality of the eGBA module 502a. At 520, if no valid Ks is available, the eGBA module 502a may bootstrap with the network BSF 508, which may result in the Ks being derivable in the UE 502. From Ks, the application specific key (Ks_(ext/int)_NAF key) may be derived. The parameters sent as part of the authentication request at 516 by the OP/NAF 506 may be used to compute the Ks_(ext/int)_NAF keys. In another embodiment, the parameters sent during the Authorization Request/challenge sent from the Client/RP 504 may be used to compute the Ks_(ext/int)_NAF.

Still referring to FIG. 4, in accordance with the illustrated embodiment, at 521 the eGBA module 502a generates OpenID Connect tokens and signs the tokens using the Ks_NAF key. A header in the respective token may comprise an indicator for the OP/NAF 506 that the token has been generated locally. At 522, the eGBA module 502a passes a redirect message to the BA 502b. The redirect message comprises the signed tokens, and redirects the BA 502b to the endpoint of the RP 504. In an example embodiment, the token header includes information to carry the B-TID. In an alternative embodiment, the eGBA module 502b calculates the authentication digest and then uses the digest as a signature key to sign the token, instead of using the Ks_NAF key for example. Thus, the OP/NAF 506 may use the digest (see step 528) to verify the token signature.

At 528, in accordance with the illustrated embodiment, the BA 502b generates an HTTP(S) GET request that comprises the signed tokens. The BA 502b may send the request to the RP 504. As described above, the RP 504 may not be able to verify the token on its own according to an example scenario, so the RP may contact the check ID endpoint 527 at the OP/NAF 506 with a validate token request message comprising the ID token. At 528, the check ID endpoint at the OP/NAF 506 may read the B-TID from the token header and may request the application specific NAF key from the BSF 508 using the B-TID and an identifier of the NAF 506 (NAF_ID). The OP/NAF 506 may use this data to verify the token signature. At 529, the check ID endpoint 527 may return the verification result to the RP 504. If an access token has been requested and issued, for example, then the client 504 may authenticate toward a user info endpoint 506 at the OP/NAF 506 using the client secret (e.g., established during discovery/registration) in accordance with the illustrated embodiment. Further, at 530, the RP 504 may send the access token to the OP/NAF 506 in a request for user data. If no access token is requested, the process may proceed to step 534 without performing steps 530 and 532. At 532, the user info endpoint 531 returns the requested user data (e.g., nickname, address, date of birth, etc.) after verification of the access token signature using the Ks_NAF key. At 534, the user, via the BA 502b for example, may access the service that is provided by the RP 504.

In accordance with another embodiment, generally referring to FIG. 4, the eGBA module 502a unlocks the private key so that pre-installed public/private key pairs may be used. In accordance with the example embodiment, the eGBA module 502a is equipped with a private key. The corresponding public key and certificate (chain) may be available at the OP/NAF 506 at a location/URL that is known to the eGBA module 502a. For example, the BA 502b may send a user identifier to the RP 504. The RP 504 may build an authorization request and may redirect the BA 502b to the OP 506 with the authorization request. The BA 502b may follow the redirect and send a HTTP GET request to the OP 506. The OP/NAF 506 may initiate the UE/User authentication by responding with an HTTP 401 'unauthorized' message. Such a message may comprise, in the WWW Authenticate header for example, a challenge and some parameters relating to freshness (e.g., nonces) that requests that the UE 502 use Digest GBA authentication. The request may further include an indicator and parameters (e.g., nonces) relating to freshness (e.g., nonces) that local token generation with public/private keys should be used. It will be understood that the request message may be constructed in accordance with 3GPP TS 33.222. The BA 502b may send the Digest challenge parameters and an indicator to the eGBA module 502a. Such an indicator may indicate that local token generation and signature should be used. If an access token is requested, a JavaScript function, for example, may request user permission/authorization, and then may pass the user permission/authorization information to the eGBA module 502a. Such information may enable the eGBA module 502a to create ID tokens and access tokens. In an example embodiment, the actual authentication of the user of the UE 502 may be done by requesting the user to enter a PIN, for example, to unlock functionality of the eGBA module 502a. At 520, if no valid Ks is available, the eGBA module 502a may bootstrap with the network BSF 508, which may result in the Ks being available in the UE 502. From Ks, the application specific key (Ks_(ext/int)_NAF key) may be derived. Alternatively, the Ks_(ext/int)_NAF may be derived using Ks, the corresponding application, and the parameters that were sent as part of the freshness parameters. Such freshness paraterms may be send from the RP 504 at 512, from the OP/NAF 506 at 516, or a combination thereof.

In accordance with the example embodiment, the eGBA module 502a may generate OpenID Connect tokens and may sign them using the private key, for example, by using the appropriate algorithm (e.g., one of the RSA variants). The private key for signing the token may become available when the Ks_NAF has been calculated correctly. The private key may be stored in the eGBA module 502a via an out-of-band process. The eGBA module 502a may include the URL for the public key/certificate in the x5u parameter in the header of the token signature. The eGBA module 502a may include the digest and the B-TID in the header of the token. The eGBA module 502*a* may pass the redirect message, including the signed tokens for example, to the BA 502*b*. The redirect message may redirect the BA 502*b* to the endpoint of the RP 504.

The BA 502*b* may send an HTTP(S) GET request to the RP endpoint, wherein the request may include the signed tokens. For example, following the redirect, the tokens are sent to the RP endpoint. In accordance with one embodiment, the RP 504 wants to verify the ID token signature itself. Thus, the RP 504 may retrieve the public key and certificate from the URL that was provided in the x5u parameter in the header of the token. If the RP 504 did not request an access token, the UE 502 may access the requested service that is provided by the RP 504. If the RP 504 did request (and receive) an access token, the client 504 may authenticate towards a user info endpoint as described below. If the RP does not verify the ID token itself, it may contact a check ID endpoint of the OP/NAF 506 with the ID token. This communication may be protected by the use of a client secret that is shared between the RP 504 and the OP 506. Regardless whether the RP 504 verifies itself, the check ID endpoint may receive the B-TID from the token header and may retrieve the application specific NAF key from the BSF 508 using the B-TID and the NAF_ID. The check ID endpoint 611 may use the application specific NAF key to check the digest in the token header and then may use the certificate, as indicated in the x5u parameter, to check the token signature. Thus, the check ID endpoint may return a verification result to the RP 504.

Continuing the example embodiment described above, the client 504 may authenticate towards a user info endpoint at the OP/NAF 506, for example, using the client secret (e.g., established during discovery/registration). The client 504 may send the access token to the user info endpoint in a request for user data. The user info endpoint may return the requested user data (e.g., nickname, address, date of birth, etc.). Thus, the user of the UE 502 may access the requested service that is provided by the RP 504.

Generally referring to FIG. 4, in accordance with another example embodiment, pre-installed private/public keys with dynamic URLs are used for GBA verification. Before further describing the embodiment in which pre-installed private/public keys with dynamic URLs are used, some background information on dynamic URLs is presented. In accordance with the illustrated embodiment shown in FIG. 4, the OP/NAF 506 may be capable of working with dynamic URLs. The OP/NAF 506 may provide a certificate endpoint URL (e.g., www.opnaf.com/cert.php) that is able to accept additional parameters. Dynamic URLs denote webpages that are built dynamically by the server, for example, by using server side scripting languages such as PHP. A dynamic URL can have the form of http://example.com/site.php?a=123&b=456. In this example case, the script site.php can evaluate the values of the parameters a and b, and based on the two corresponding values (123 and 456), can generate the response content. It will be understood that other alternatives for dynamic URLs are also possible, where different solutions are employed. For example, it might not be necessary to call a specific script as in the example above. For example, some of the URL shortening services such as bit.ly. can convert a long URL such as http://tools.ietf.org/html/draft-jones-json-web-signature-04 to a short version such as http://bit.ly/y6iGYk. The http://bit.ly/y6iGYk URL is then a dynamic page hosted by bit.ly which redirects to the original URL.

The following protocol description illustrates an example for using dynamic URLs with pre-installed private/public keys for GBA verification according to an example embodiment. It may be better understood with general reference to FIG. 4. The BA may send an user identifier, such as an OpenID Connect identifier, to the RP 504. The RP may build the authorization request and redirect the BA 502*b* to the OP 506 with the authorization request. The BA 502*b* may follow the redirect and send an HTTP GET request to the OP 506. The OP/NAF 506 may initiate the UE/User authentication by responding with an HTTP 401 'unauthorized' message which comprises, in the WWW Authenticate header for example, the challenge and freshness parameters (e.g., nonces). The challenge may request and/or the freshness parameters may require that the UE 502 use GBA authentication. The message may comprise an indicator that local token generation using the public/private keys be used. Negotiation and selection of authentication protocols may occur. The BA 502*b* may send the Digest challenge parameters to the eGBA module 502*a*. If an access token is requested, the JavaScript function may ask for user permission/authorization, for example. Such information may then be passed to the eGBA module 502*a*, for example, so that the eGBA module 502*a* may create ID tokens and access tokens. The eGBA module 502*a* may implement methods/protocols to authenticate the user, for example, by requesting a PIN code to be entered in order to unlock the eGBA module 502 functions. If no valid Ks is available, for example, the eGBA module 502 bootstraps with the network BSF 508, resulting in the Ks being available in the UE 502. From Ks the application specific Ks_(ext/int)_NAF key may be derived. Alternatively, the freshness parameters may also be used to generate the Ks_(ext/int)_NAF. The Ks_(ext/int_NAF) keys may be generated in the same manner at both the eGBA module 502*a* and at the BSF 508.

Continuing with the example embodiment described above, the eGBA module 502*a* may calculate the digest response for GBA authentication. The eGBA module 502*a* may also generate the OpenID Connect tokens and sign them with the private key using the appropriate algorithm (e.g., one of the RSA variants). The eGBA module 502*a* may build the URL for the public key/certificate in the x5u parameter in the header of the token signature by appending the B-TID and the digest as parameters to a certificate endpoint URL (e.g., x5u=www.opnaf.com/cert.php?BTID=123456&digest=abc123). The eGBA module 502*a* may then pass the redirect message that includes the signed tokens to the BA 502*b*, which redirects the BA 502*b* to the RP endpoint. The BA 502*b* may generate an HTTP(S) GET request to an endpoint of the RP 504. The request may include the signed tokens. Thus, following the redirect, the tokens may be sent to the endpoint of the RP 504.

If the RP 504 wants to verify the ID Token signature, for example, it may query the public key and certificate from the URL provided in the x5u parameter in the header of the token. The URL may point to the certificate endpoint of the OP/NAF 506. For example, the RP 504 may issue a request to the certificate endpoint with the parameters as provided by the eGBA module 502*a* as described above (e.g., HTTP GET request to www.opnaf.com/cert.php?BTID=123456&digest=abc123). The certificate endpoint may use the B-TID parameter and may retrieve the application specific NAF key from the BSF 508 using the B-TID and the NAF_ID. It may use the key to check the digest in the token header. If the digest is correct, the certificate endpoint of the OP/NAF 506 may return the valid public key/certificate to the RP 504, which may then use the certificate to check the token signature. If the RP 504 did not request an access token, the user may receive access to the service. If the RP 504 did request (and receive) an access token, the access token may be used to receive user information before the user receives access to the service, as described herein. Verification of the token signature may result in the UE 502 being provided access to the service provided by the RP 504.

If the RP 504 does not verify the ID token itself, for example, it may contact a check ID endpoint of the OP/NAF 506 with the ID Token. This communication may be protected by the use of a client secret, shared between the RP 504 and the OP 506 for example. The check ID endpoint may receive the B-TID from the token header and may retrieve the application specific NAF key from the BSF 508 using the B-TID and the NAF_ID. The check ID endpoint may use the key to check the digest in the header and then may use the certificate as indicated in the x5u parameter to check the token signature. Thus, the check ID endpoint may then return the verification result to the RP 504. If the RP 504 did not request an access token, the user may receive access to the service. If the RP did request (and receive) an access token, the client 504 may authenticate towards the user info endpoint at the OP/NAF 504 using the client secret (established during discovery/registration) and may send the access token in a request for user data. The user info endpoint may return the requested user data (e.g., nickname, address, date of birth, etc.), and the user, and thus the UE 502, may receive access to the service provided by the RP 504.

Figure 5:
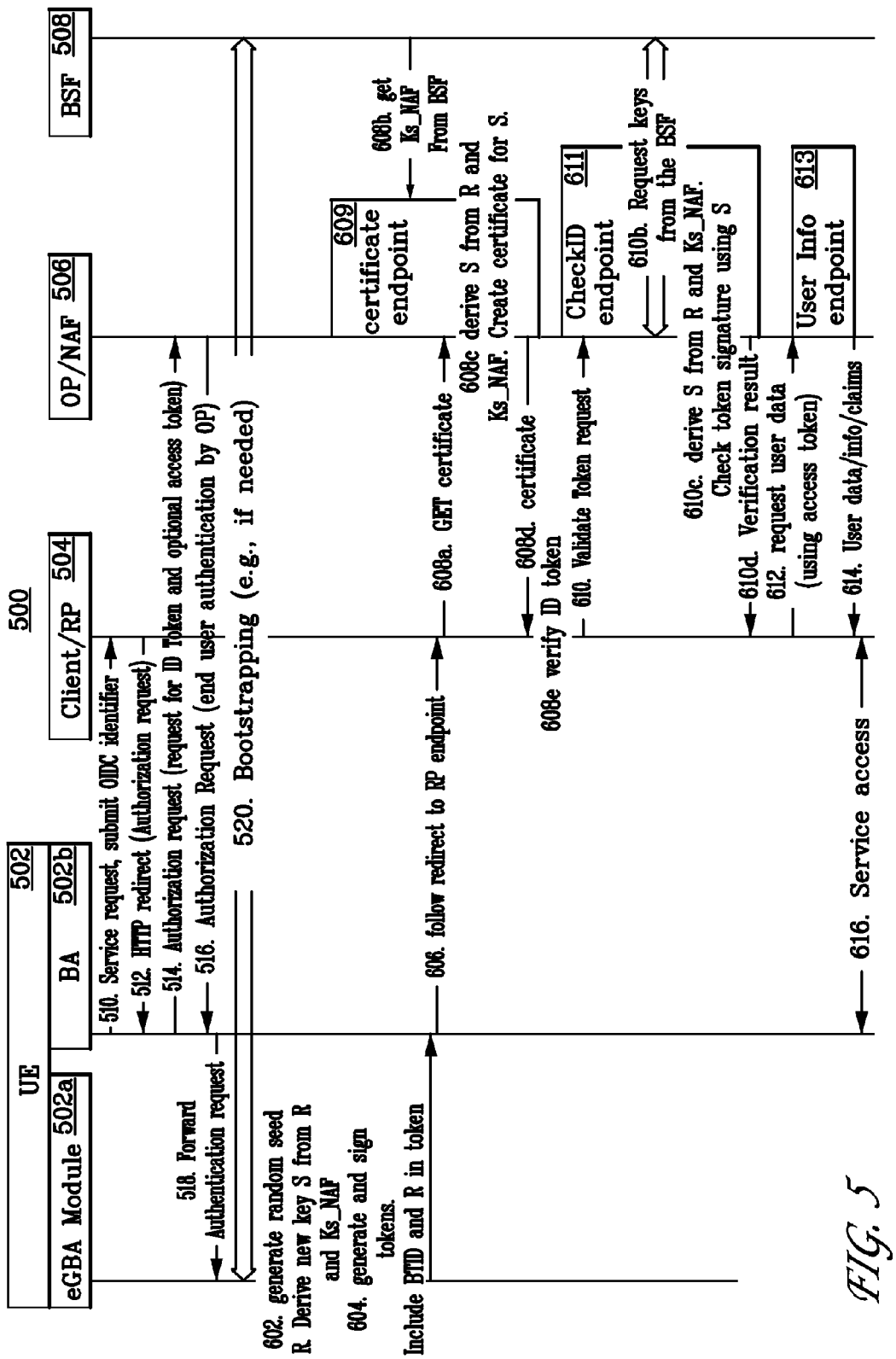
FIG. 5 is a flow diagram of an OpenID Connect protocol flow with GBA using derived keys according to an example embodiment.

Referring to FIG. 5, in accordance with the illustrated embodiment, derived keys are used. In particular, the eGBA module 602a is able to create keys which can then be used to sign the tokens. These signature keys may be derived by the eGBA module 602a with a key derivation function from the Ks_NAF and a random seed, which may indicate freshness. Alternatively, the signature key may be derived from the GBA digest result and the random seed. The OP/NAF 506 and a local OP may use the same derivation method, and thus agree once on whether they use the Ks_NAF, the digest as input and/or other parameters (e.g., freshness parameters such as nonce, salt, etc.) to the derivation function. In accordance with the illustrated embodiment, the OP/NAF 506 supports dynamic URLs.

Referring to FIG. 5, steps 510-520 may be executed as described above with respect to FIG. 4. At 602, in accordance with the illustrated embodiment, the eGBA module generates a random seed value R. In an example embodiment, freshness parameters may be sent by the OP/NAF 506. A public/private key pair may be derived from R or freshness parameters that (sent from the OP/NAF 506) and the Ks_NAF (e.g., or the digest). The OP/NAF 506 and the eGBA module 502a may agree on whether the Ks_NAF or the digest value is used. This agreement may be established a priori or as part of the call flow, for instance the directive for the agreement may be part of the authentication request in step 516.

At 604, the eGBA module 502a generates the OpenID Connect tokens and signs them using the previously generated private key from step 602, for example, by using the appropriate algorithm (e.g., one of the RSA variants). The x5u parameter may be set by adding the B-TID and the random seed value as parameters to the certificate endpoint URL (e.g., www.opnaf.com/cert.php?BTID=123456&r=xyz). The random seed may be included in the token header. The eGBA module may pass the redirect message, including the signed tokens, to the BA 502 which may redirect the BA to an endpoint of the RP 504. At 606, the BA 502b may generate a HTTP(S) GET request and transmit the request to the endpoint of the RP 504. The request may include the signed tokens. Thus, the tokens may be sent to the RP endpoint in the redirect message.

Still referring to FIG. 5, in accordance with one example scenario of the illustrated embodiment, the RP 504 wants to verify the ID token signature. At 608a, the RP 504 queries the public key and certificate from the URL provided in the x5u parameter in the header of the token. The URL may point to a certificate endpoint 609 of the OP/NAF 506. For example, the RP 504 may issue a request to the certificate endpoint 609 with the parameters as provided by the eGBA module 502a in step 604 (e.g., HTTP GET request to www.opnaf.com/cert.php?BTID=123456&r=xyz). At 608b, the certificate endpoint 609 may use the B-TID parameter and may retrieve the application specific NAF key from the BSF 508 using the B-TID and the NAF_ID. At 608c, the certificate endpoint 609 may use the random seed R (xyz) and the Ks_NAF (or the digest, for example, depending on what was agreed on initially by the OP/NAF 506 and the eGBA module 502a) to derive the same key pair as the eGBA module 502a derived at 602. The certificate endpoint 609 may then create a certificate for the public key from this key pair. At 608d, the OP/NAF 506 certificate endpoint 609 may return the calculated public key/certificate to the RP 504. At 608e, the RP 504 may use the certificate/key to check the token signature. If the RP 504 did not request an access token, for example, the flow may proceed to 616, as described below. If the RP 504 did request (and receive) an access token, for example, the flow may continue to 614, as described below.

Still referring to FIG. 5, in accordance with another example scenario of the illustrated embodiment, the RP 504 does not want to verify the ID token signature itself. At 610a, the RP 504 may contact a check ID endpoint 611 of the OP/NAF 506 with the ID Token. This communication may be protected by the use of a client secret that is shared between the RP 504 and the OP 506. At 610b, the check ID endpoint 611 may get the B-TID and random seed R from the token header and may retrieve the application specific NAF key from the BSF 508, for example, using the B-TID and the NAF_ID. At 610c, the check ID endpoint 611 may use the random seed R (xyz) and the Ks_NAF (or the digest, for example, depending on what was agreed on initially by the OP/NAF 506 and the eGBA module 502a) to derive the same key (pair) as the eGBA module 502a derived at 604. The OP/NAF 506 may check the token signature using the generated key. At 610d, the OP/NAF 506 check ID endpoint 611 may return the verification result to the RP 504. If the RP 504 did not request an access token, for example, the flow may proceed to 616. If the RP did request (and receive) an access token, for example, the flow may proceed to 614.

At step 612, in accordance with the illustrated embodiment, the client 504 authenticates toward a user info endpoint 613 at the OP/NAF 506 using the client secret (established during discovery/registration) and sends the access token to the user info endpoint 613 in a request for user data. At 614, the user info endpoint 613 returns the requested user data (e.g., nickname, address, date of birth, etc.) to the RP 504. At 616, the user, and thus the UE 502, may access the requested service that is provided by the RP 504. For example, the UE 502 may be provided access to the requested service based on the signature of the ID token and/or the signatures of respective access tokens being verified.

Figure 6:
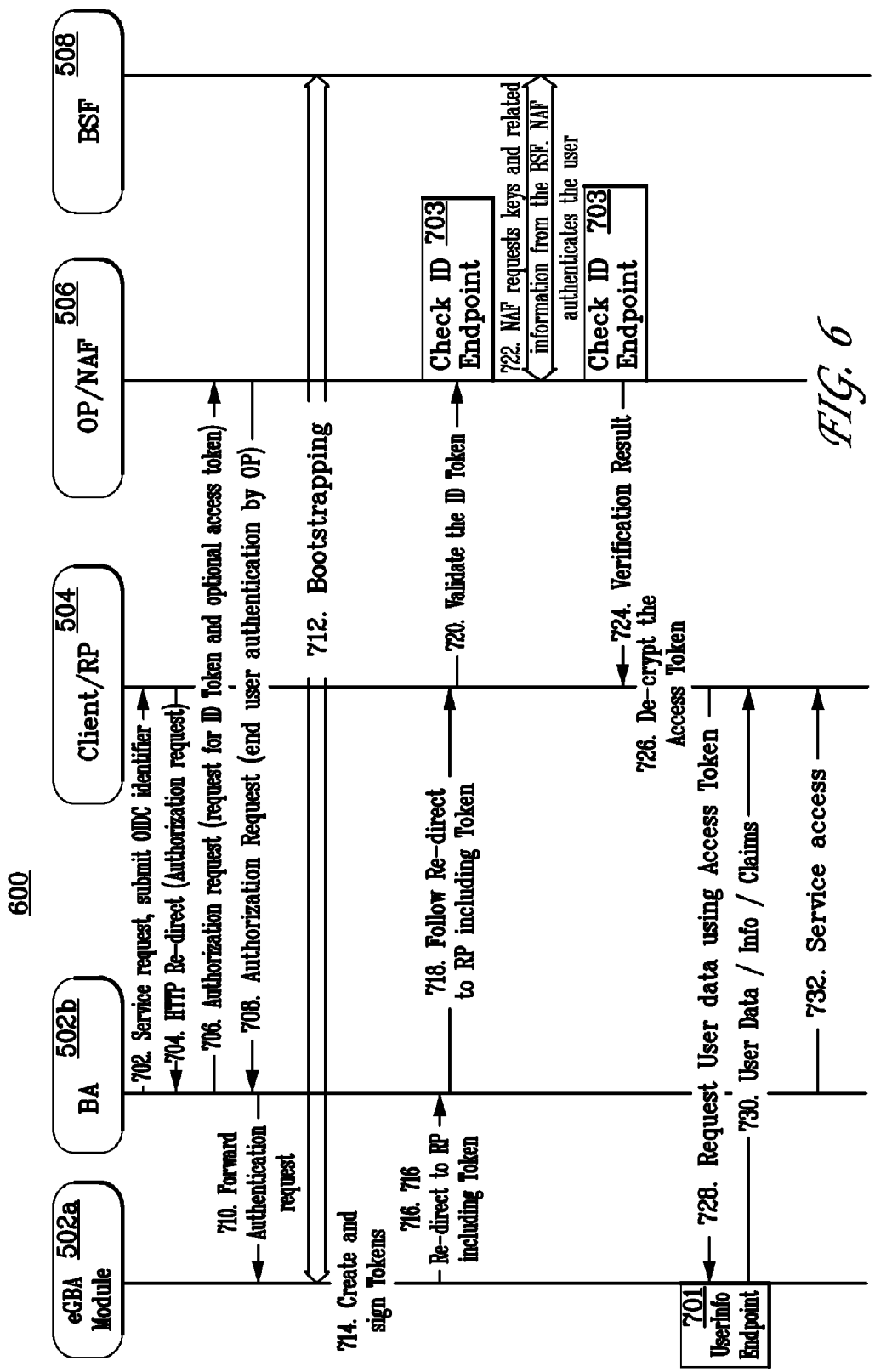
FIG. 6 illustrates a flow diagram of an OpenID Connect protocol flow with GBA using locally stored user data according to another example embodiment.

As described herein, user data (e.g., user attributes) may be stored at a user info endpoint, for instance at the user info endpoint 531 shown in FIG. 4 or the user info endpoint 613 shown in FIG. 5. In accordance with various embodiments, the user info endpoint may reside on a network entity, a cloud, or the like, or a combination thereof. Thus, the user data may be accessed from the network or cloud. FIG. 6 is a call flow in accordance with an example embodiment in which a user info endpoint 701 resides locally on the UE 502. In particular, in accordance with the illustrated embodiment, user data is stored on the eGBA module 502a, although it will be understood that the locally stored data may reside on the UE 502 as desired, such as on a UICC of the UE for example. Locally stored user data may include confidential information. As described below, various mechanisms allow for the authorization and transport of locally stored user data.

In an example scenario, a user may want certain confidential information, such as his/her Social Security Number (SSN) for example, to be stored locally on the UE 502. Such locally stored information may be stored on the eGBA module 502a, rather than in the network/cloud. A local policy, which may be controlled and configured by multiple stakeholders such as the OP/NAF and User within the UE for example, may authorize the release of the confidential information stored in the UE 502 to the client/RP 504.

For example, users may not be confident about the security and/or privacy of their confidential information that is stored on the network or cloud. Such information may include the social security numbers of users, for example. Users may choose to keep that information private by storing it on the UE 502. In an example configuration, users may store some user attributes (e.g., name, address, or the like) on the network while other user attributes (e.g., Social Insurance Number, date of birth, or the like) are stored locally on a secure environment, such as the eGBA module 502a for example, of the UE 502. In an example scenario in which a user wants to obtain the services of a financial institution, the institution may require the user's SSN in order for the user to access a service that is provided by the financial institution. Following a successful authentication that may be network based and/or local, for example, a policy on the UE 502 may authorize the release of the locally stored SSN to that financial institution. In such an example scenario in which the SSN is locally stored, other user information, for example non-confidential user attributes, may be obtained by the institution from the network/cloud.

Referring to FIG. 6, at 702, the BA 504 sends a user identifier to the RP 506, and requests access to a service that is provided by the RP 504. At 704, the RP 506 may build the authorization request and may redirect the BA 504 to the eGBA module 502a with the authorization request (at 706). At 708, a user of the UE 502 may be requested to be authenticated by the OP/NAF 506. Freshness parameters may also be requested. At 710, the BA 502b may send the Digest challenge parameters and an indicator to the eGBA module 502a. Such an indicator may indicate that local token generation and signature should be used. If an access token is requested, a JavaScript function, for example, may request user permission/authorization, and then may pass the user permission/authorization information to the eGBA module 502a. Such information may enable the eGBA module 502a to create ID tokens and access tokens. In an example embodiment, the actual authentication of the user of the UE 502 may be done by requesting the user to enter a PIN, for example, to unlock functionality of the eGBA module 502a. At 712, if no valid Ks is available, the eGBA module 502a may bootstrap with the network BSF 508, which may result in the Ks being derivable in the UE 502. From Ks, the application specific key (Ks_(ext/int)_NAF key) may be derived in addition to using the freshness parameters.

At 714, the eGBA module 502a generates tokens in accordance with an OpenID Connect protocol. The eGBA module 502a may sign the tokens at 714. The tokens may be signed using the Ks_NAF key. A header in the respective token may comprise an indicator for the OP/NAF 506 that the token has been generated locally at the UE 502. At 716, the eGBA module 502a passes a redirect message to the BA 502b. The redirect message comprises the signed tokens, and redirects the BA 502b to the endpoint of the RP 504. In an example embodiment, the token header includes information to carry the B-TID. In an alternative embodiment, the eGBA module 502b calculates the authentication digest and then uses the digest as a signature key to sign the token, instead of using the Ks_NAF key for example. Thus, the OP/NAF 506 may use the digest to verify the token signature. At 718, in accordance with the illustrated embodiment, the BA 502b generates an HTTP(S) GET request that comprises the signed tokens. The BA 502b may send the request to the RP 504 at 718. As described above, the RP 504 may not be able to verify the token on its own according to an example scenario, so the RP 504, at 720, may contact a check ID endpoint 703 at the OP/NAF 506 with a validate token request message comprising the ID token. At 722, the check ID endpoint 703 at the OP/NAF 506 may read the B-TID from the token header and may request the application specific NAF key from the BSF 508 using the B-TID and an identifier of the NAF 506 (NAF_ID). The key may further be requested using the freshness parameter. The OP/NAF 506 may use this data to verify the token signature. At 724, the check ID endpoint 703 may return the verification result to the RP 504.

Still referring to FIG. 6, in accordance with the illustrated embodiment, the client 504 decrypts the access token at 726. The access token may be decrypted using the client secret (e.g., established during discovery/registration) in accordance with the illustrated embodiment. For example, one or more of the signed tokens may comprise access tokens that may be formatted in accordance with an OpenID Connect protocol. The access tokens may be generated locally on the UE 502 via the eGBA module 502a, at 714, with or without the knowledge of a network entity such as the OP 506. The access tokens may be sent to the RP 504 at steps 716 and 718. An access token that is associated with specific user data or a class of user data may be bound to a location (e.g., URL) that corresponds to the location of a user info endpoint that is associated with the access token. In accordance with the illustrated embodiment shown in FIG. 6, the access token is associated with user data that is stored at the user info endpoint 701, which resides on the eGBA module 502a. In an example configuration, user data (e.g., attributes) may be classified as confidential or nonconfidential, and confidential data may be accessed from the user info endpoint 701 that resides locally on the UE 502, and nonconfidential data may be accessed at a user info endpoint that resides on the network.

The access token may carry information about the location of the user info endpoint 701, such as the location of the eGBA module 502a that hosts the user info endpoint 701. Alternatively, the location information of the user info endpoint may be transported as part of the redirect message at 718, instead of being part of the access token for example. At 728, the RP 504 requests the user data from the user info endpoint 701 that resides locally on the UE 502, for example, by using an access token. At 730, the user info endpoint 701 returns the requested user data (e.g., social security number, address, etc.). In an example embodiment, at 732, the UE 502 receives full access to the service provided by the client 504 after user data is received by the RP 504.

In another example embodiment described herein, access tokens may be generated in the network/cloud. For example, a network entity may generate an access token instead of the UE, and the tokens may be sent to the RP. The access tokens may carry information about the location (e.g., URL) of the user info endpoint, and the location may correspond to an entity in the network/cloud or a user Info endpoint on the UE or within a trusted module within the UE. The user info endpoint location information may be carried within the message body of the access token.

Information that is accessible with the token(s) may reside on the UE, possibly without the knowledge of an identity provider or network/cloud entity, according to an example embodiment. Alternatively, the information that is accessible with respective tokens may reside on the network/cloud. Information in the tokens may be signed and/or encrypted to protect the token data from eavesdropping. Such information may be decrypted to obtain the token information. Such measures may ensure that only the rightful SP/Client/RP that has the correct key is able to obtain the token. Once the token is decrypted by the SP/Client/RP, the SP/client/RP may present the token to the user info endpoint. The UE or the trusted module on the UE and/or the network/cloud entity may generate and/or verify tokens and provide the requested data to the SP/Client/RP. The information elements may be distributed between the network and UE or common and synced between the network and UE.

Figure 7:
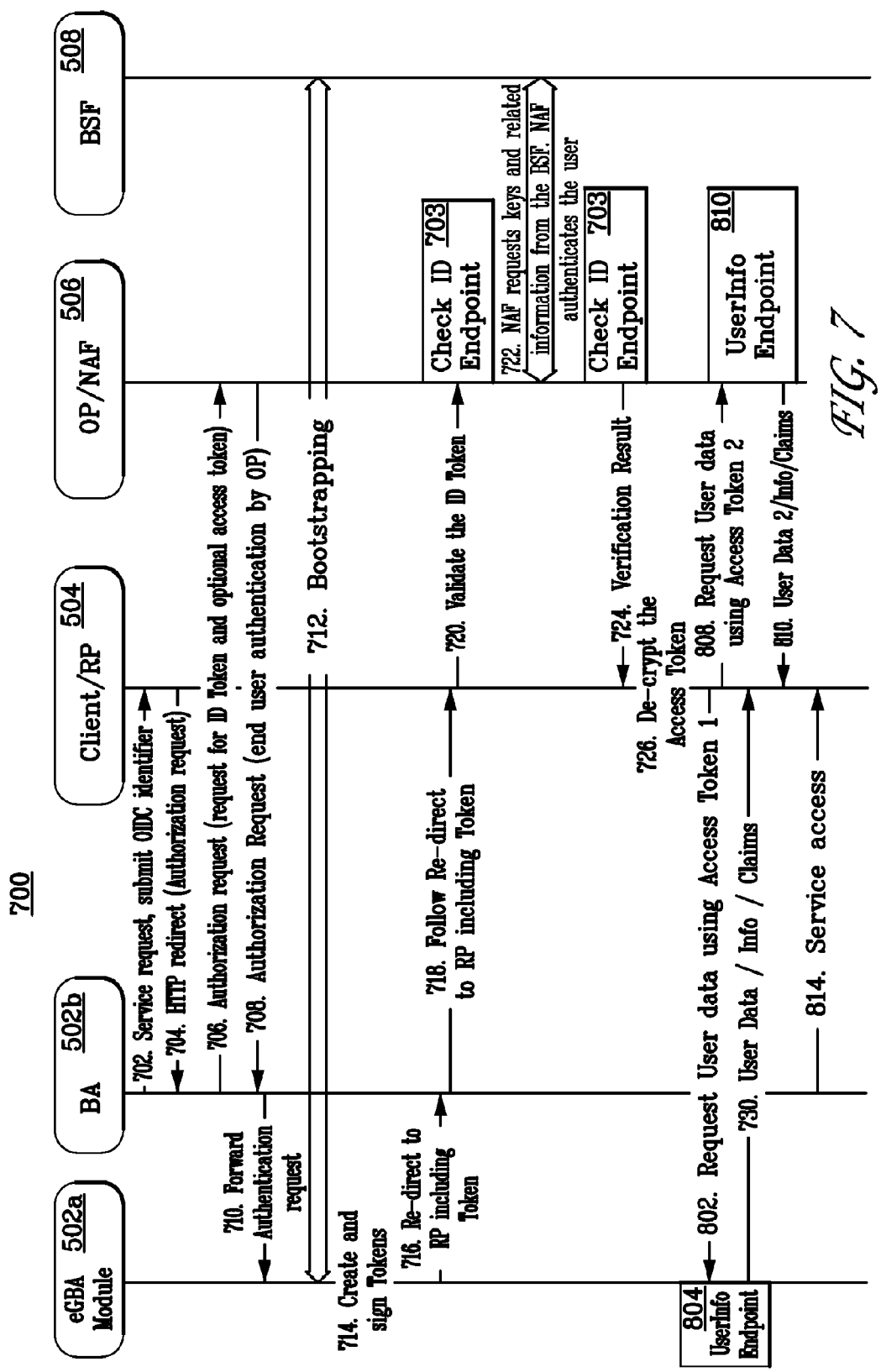
FIG. 7 illustrates a flow diagram of an OpenID Connect protocol flow with GBA using user data stored locally and on the network according to another example embodiment.

Referring to FIG. 7, in accordance with the illustrated embodiment, some of the user data is stored locally on the UE 502 and some of the user data is stored on the network. Referring to FIG. 7, the reference numbers that are also in FIG. 6 are described above with respect to FIG. 6. In an example configuration, user data that qualifies as confidential data may be stored locally and user data that qualifies as non-confidential data may be stored on a network/cloud entity. In an alternative configuration, the data is not classified as confidential data or non-confidential data, and the data may be stored on the UE, on a network entity, or on a combination thereof.

Upon a successful user authentication and verification of the identity token, the RP 504 may request user data (e.g., user attributes) at 802 and 808. At 802, in accordance with the illustrated embodiment, the RP 504 uses a first access token to retrieve user data from a first user info endpoint 804 that resides within the UE 502 at the eGBA module 502a. Such user data may have been classified as confidential data. The first access token may comprise the location information of the user info endpoint 804. At 806, confidential user data, for example, may be provided to the RP 504. At 808, the RP 504 uses a second access token to retrieve user data from the user info endpoint 810 that resides on a network entity (e.g., OP/NAF 506). Such user data may have been classified as nonconfidential data. The second access token includes the location information (e.g., URL) of the user info endpoint 810 in order for the RP 504 to redeem the user data from the user info endpoint 810, at 812. The first access token that is associated with the confidential data and is used to obtain data from storage within the UE 502 may be provided by the eGBA module 502a. The location (e.g., URL) of the user info endpoint 804 may also be provided by the eGBA module 502a of the UE 502. In accordance with the illustrated embodiment, after data, such as confidential and nonconfidential data for example, is obtained by the RP 504, the data may be combined at the RP 504 and used for providing the UE 502 access (at 814) to services that are provided by the RP 504. Thus, the data may be combined and consumed at the RP 504. In an alternate embodiment, the RP 504 first presents the access token to the user info endpoint 810 on the network in order to obtain user data from the network. The obtained user data and the access token is presented to the user info endpoint 804 on the eGBA module 502a to redeem confidential user data.

Thus, as described herein, each access token or each class of user data (e.g., confidential, non-confidential, sensitive, general, or the like) may be associated with a location of user data. The location of the user data may correspond to a location of a UE or trusted modules such as UICC (e.g., a URL to the UE/UICC), a location in the network/cloud (e.g., URL to an entity within the network/cloud), or a combination thereof. Thus, user attributes that are stored in various locations may be requested, processed, combined, and consumed by a SP/Client/RP.

Figure 8A:
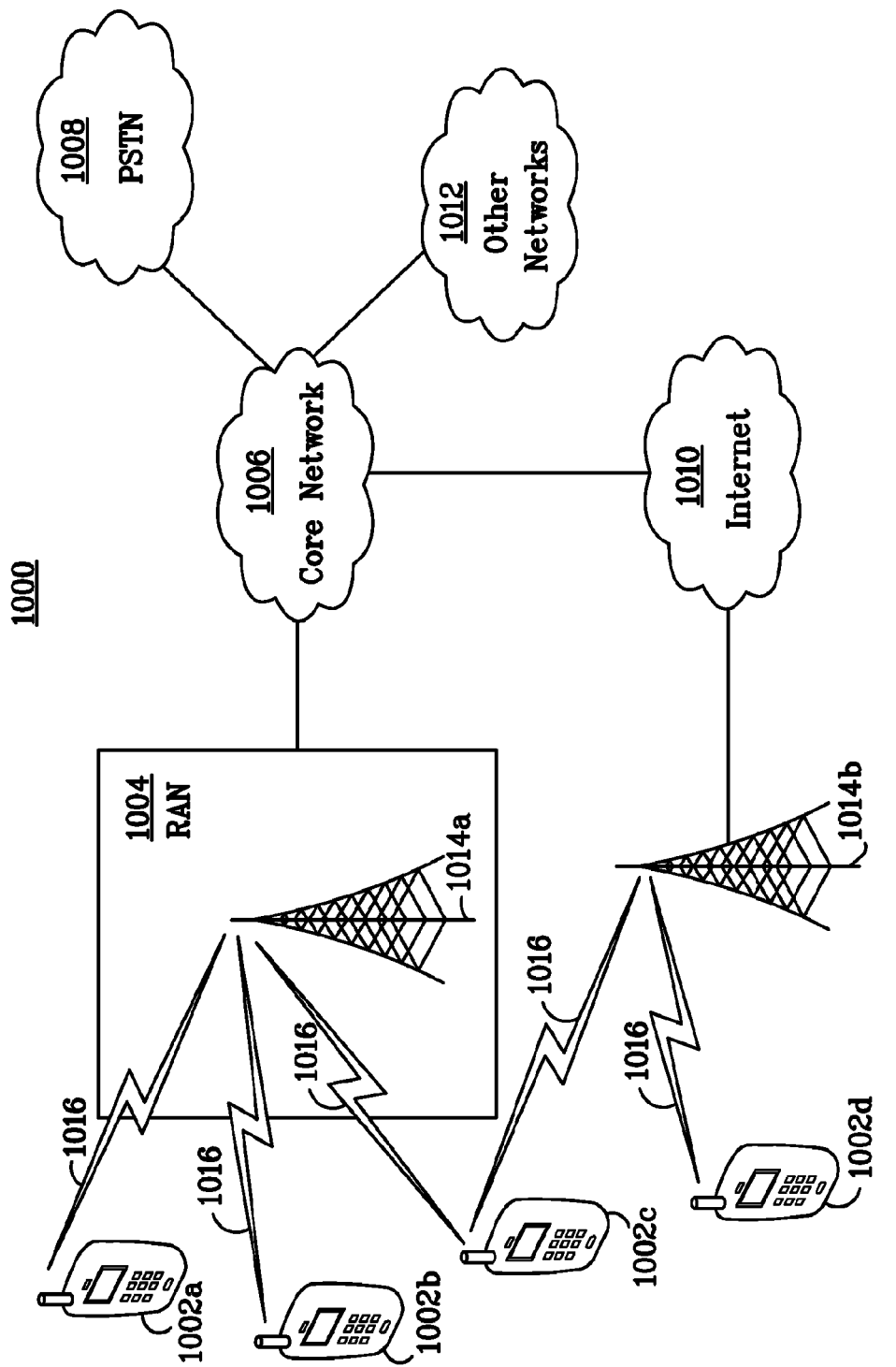
FIG. 8A is a system diagram of an example communications system in which one or more disclosed embodiments may be implemented.

FIG. 8A is a diagram of an example communications system 1000 in which one or more disclosed embodiments may be implemented. The communications system 1000 may be a multiple access system that provides content, such as voice, data, video, messaging, broadcast, etc., to multiple wireless users. The communications system 1000 may enable multiple wireless users to access such content through the sharing of system resources, including wireless bandwidth. For example, the communications systems 1000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 1000 may include wireless transmit/receive units (WTRUs) 1002a, 1002b, 1002c, 1002d, a radio access network (RAN) 1004, a core network 1006, a public switched telephone network (PSTN) 1008, the Internet 1010, and other networks 1012, though it will be appreciated that the disclosed embodiments contemplate any number of WTRUs, base stations, networks, and/or network elements. Each of the WTRUs 1002a, 1002b, 1002c, 1002d may be any type of device configured to operate and/or communicate in a wireless environment. By way of example, the WTRUs 1002a, 1002b, 1002c, 1002d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1000 may also include a base station 1014a and a base station 1014b. Each of the base stations 1014a, 1014b may be any type of device configured to wirelessly interface with at least one of the WTRUs 1002a, 1002b, 1002c, 1002d to facilitate access to one or more communication networks, such as the core network 1006, the Internet 1010, and/or the networks 1012. By way of example, the base stations 1014a, 1014b may be a base transceiver station (BTS), a Node-B, an eNode B, a Home Node B, a Home eNode B, a site controller, an access point (AP), a wireless router, and the like. While the base stations 1014a, 1014b are each depicted as a single element, it will be appreciated that the base stations 1014a, 1014b may include any number of interconnected base stations and/or network elements.

The base station 1014a may be part of the RAN 1004, which may also include other base stations and/or network elements (not shown), such as a base station controller (BSC), a radio network controller (RNC), relay nodes, etc. The base station 1014a and/or the base station 1014b may be configured to transmit and/or receive wireless signals within a particular geographic region, which may be referred to as a cell (not shown). The cell may further be divided into cell sectors. For example, the cell associated with the base station 1014a may be divided into three sectors. Thus, in an embodiment, the base station 1014a may include three transceivers, i.e., one for each sector of the cell. In an embodiment, the base station 1014a may employ multiple-input multiple-output (MIMO) technology and, therefore, may utilize multiple transceivers for each sector of the cell.

The base stations 1014a, 1014b may communicate with one or more of the WTRUs 1002a, 1002b, 1002c, 1002d over an air interface 1016, which may be any suitable wireless communication link (e.g., radio frequency (RF), microwave, infrared (IR), ultraviolet (UV), visible light, etc.). The air interface 1016 may be established using any suitable radio access technology (RAT).

More specifically, as noted above, the communications system 1000 may be a multiple access system and may employ one or more channel access schemes, such as CDMA, TDMA, FDMA, OFDMA, SC-FDMA, and the like. For example, the base station 1014a in the RAN 1004 and the WTRUs 1002a, 1002b, 1002c may implement a radio technology such as Universal Mobile Telecommunications System (UMTS) Terrestrial Radio Access (UTRA), which may establish the air interface 1016 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 1014a and the WTRUs 1002a, 1002b, 1002c may implement a radio technology such as Evolved UMTS Terrestrial Radio Access (E-UTRA), which may establish the air interface 1016 using Long Term Evolution (LTE) and/or LTE-Advanced (LTE-A).

In other embodiments, the base station 1014a and the WTRUs 1002a, 1002b, 1002c may implement radio technologies such as IEEE 1002.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1014b in FIG. 8A may be a wireless router, Home Node B, Home eNode B, femto cell base station, or access point, for example, and may utilize any suitable RAT for facilitating wireless connectivity in a localized area, such as a place of business, a home, a vehicle, a campus, and the like. In an embodiment, the base station 1014b and the WTRUs 1002c, 1002d may implement a radio technology such as IEEE 802.11 to establish a wireless local area network (WLAN). In an embodiment, the base station 1014b and the WTRUs 1002c, 1002d may implement a radio technology such as IEEE 802.15 to establish a wireless personal area network (WPAN). In yet another embodiment, the base station 1014b and the WTRUs 1002c, 1002d may utilize a cellular-based RAT (e.g., WCDMA, CDMA2000, GSM, LTE, LTE-A, etc.) to establish a picocell or femtocell. As shown in FIG. 8A, the base station 1014b may have a direct connection to the Internet 1010. Thus, the base station 1014b may not be required to access the Internet 1010 via the core network 1006.

The RAN 1004 may be in communication with the core network 1006, which may be any type of network configured to provide voice, data, applications, and/or voice over internet protocol (VoIP) services to one or more of the WTRUs 1002a, 1002b, 1002c, 1002d. For example, the core network 1006 may provide call control, billing services, mobile location-based services, pre-paid calling, Internet connectivity, video distribution, etc., and/or perform high-level security functions, such as user authentication. Although not shown in FIG. 8A, it will be appreciated that the RAN 1004 and/or the core network 1006 may be in direct or indirect communication with other RANs that employ the same RAT as the RAN 1004 or a different RAT. For example, in addition to being connected to the RAN 1004, which may be utilizing an E-UTRA radio technology, the core network 1006 may also be in communication with another RAN (not shown) employing a GSM radio technology.

The core network 1006 may also serve as a gateway for the WTRUs 1002a, 1002b, 1002c, 1002d to access the PSTN 1008, the Internet 1010, and/or other networks 1012. The PSTN 1008 may include circuit-switched telephone networks that provide plain old telephone service (POTS). The Internet 1010 may include a global system of interconnected computer networks and devices that use common communication protocols, such as the transmission control protocol (TCP), user datagram protocol (UDP) and the internet protocol (IP) in the TCP/IP internet protocol suite. The networks 1012 may include wired or wireless communications networks owned and/or operated by other service providers. For example, the networks 1012 may include another core network connected to one or more RANs, which may employ the same RAT as the RAN 1004 or a different RAT.

Some or all of the WTRUs 1002a, 1002b, 1002c, 1002d in the communications system 1000 may include multi-mode capabilities, i.e., the WTRUs 1002a, 1002b, 1002c, 1002d may include multiple transceivers for communicating with different wireless networks over different wireless links. For example, the WTRU 1002c shown in FIG. 8A may be configured to communicate with the base station 1014a, which may employ a cellular-based radio technology, and with the base station 1014b, which may employ an IEEE 802 radio technology.

Figure 8B:
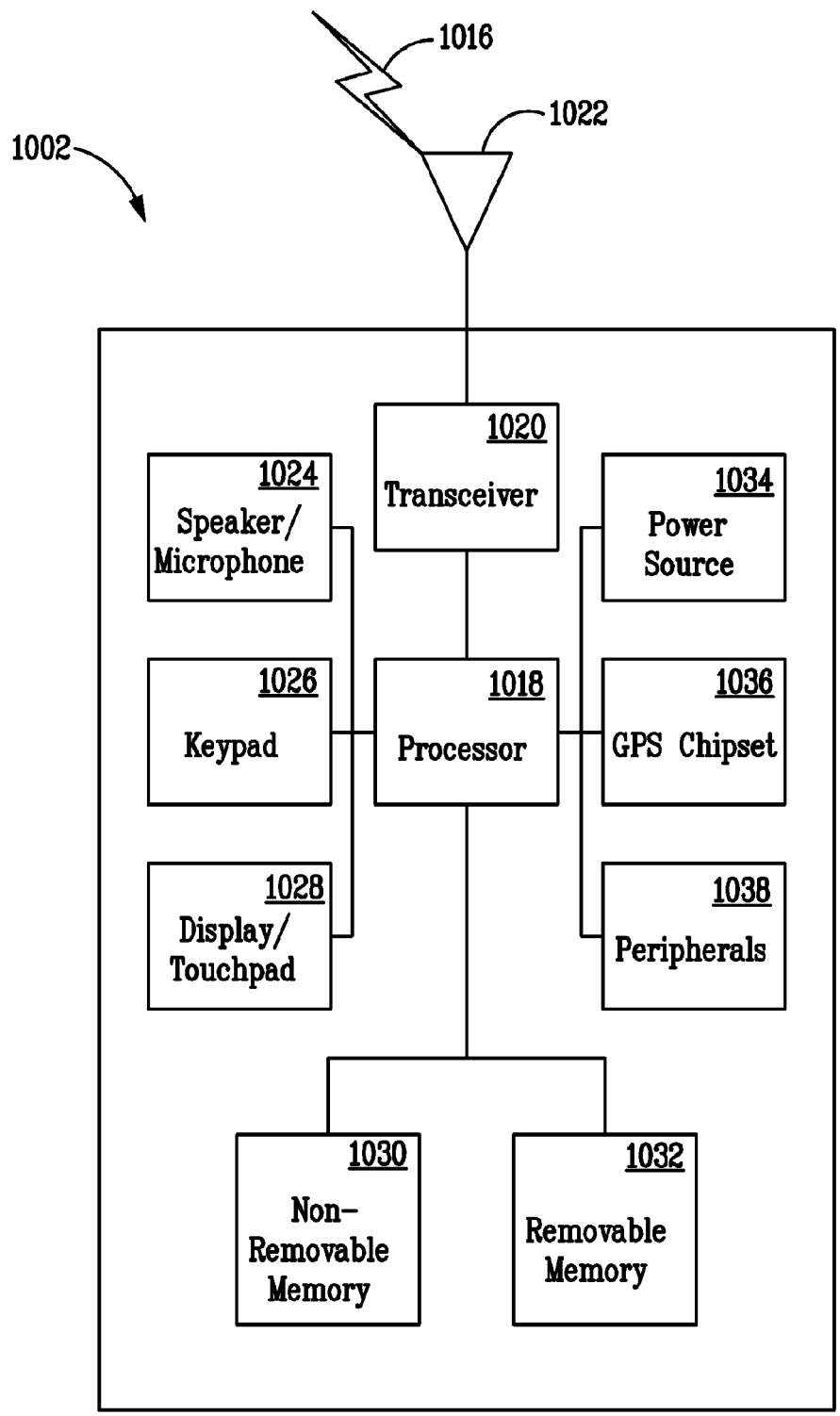
FIG. 8B is a system diagram of an example wireless transmit/receive unit (WTRU) that may be used within the communications system illustrated in FIG. 8A.

FIG. 8B is a system diagram of an example WTRU 1002. As shown in FIG. 8B, the WTRU 1002 may include a processor 1018, a transceiver 1020, a transmit/receive element 1022, a speaker/microphone 1024, a keypad 1026, a display/touchpad 1028, non-removable memory 1030, removable memory 1032, a power source 1034, a global positioning system (GPS) chipset 1036, and other peripherals 1038. It will be appreciated that the WTRU 1002 may include any sub-combination of the foregoing elements while remaining consistent with an embodiment.

The processor 1018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1018 may perform signal coding, data processing, power control, input/output processing, and/or any other functionality that enables the WTRU 1002 to operate in a wireless environment. The processor 1018 may be coupled to the transceiver 1020, which may be coupled to the transmit/receive element 1022. While FIG. 8B depicts the processor 1018 and the transceiver 1020 as separate components, it will be appreciated that the processor 1018 and the transceiver 1020 may be integrated together in an electronic package or chip. The processor 1018 may perform application-layer programs (e.g., browsers) and/or radio access-layer (RAN) programs and/or communications. The processor 1018 may perform security operations such as authentication, security key agreement, and/or cryptographic operations, such as at the access-layer and/or application layer for example.

The transmit/receive element 1022 may be configured to transmit signals to, or receive signals from, a base station (e.g., the base station 1014*a*) over the air interface 1016. For example, in an embodiment, the transmit/receive element 1022 may be an antenna configured to transmit and/or receive RF signals. In an embodiment, the transmit/receive element 1022 may be an emitter/detector configured to transmit and/or receive IR, UV, or visible light signals, for example. In yet an embodiment, the transmit/receive element 1022 may be configured to transmit and receive both RF and light signals. It will be appreciated that the transmit/receive element 1022 may be configured to transmit and/or receive any combination of wireless signals.

In addition, although the transmit/receive element 1022 is depicted in FIG. 8B as a single element, the WTRU 1002 may include any number of transmit/receive elements 1022. More specifically, the WTRU 1002 may employ MIMO technology. Thus, in an embodiment, the WTRU 1002 may include two or more transmit/receive elements 1022 (e.g., multiple antennas) for transmitting and receiving wireless signals over the air interface 1016.

The transceiver 1020 may be configured to modulate the signals that are to be transmitted by the transmit/receive element 1022 and to demodulate the signals that are received by the transmit/receive element 1022. As noted above, the WTRU 1002 may have multi-mode capabilities. Thus, the transceiver 1020 may include multiple transceivers for enabling the WTRU 1002 to communicate via multiple RATs, such as UTRA and IEEE 802.11, for example.

The processor 1018 of the WTRU 1002 may be coupled to, and may receive user input data from, the speaker/microphone 1024, the keypad 1026, and/or the display/touchpad 1028 (e.g., a liquid crystal display (LCD) display unit or organic light-emitting diode (OLED) display unit). The processor 1018 may also output user data to the speaker/microphone 1024, the keypad 1026, and/or the display/touchpad 1028. In addition, the processor 1018 may access information from, and store data in, any type of suitable memory, such as the non-removable memory 1030 and/or the removable memory 1032. The non-removable memory 1030 may include random-access memory (RAM), read-only memory (ROM), a hard disk, or any other type of memory storage device. The removable memory 1032 may include a subscriber identity module (SIM) card, a memory stick, a secure digital (SD) memory card, and the like. In other embodiments, the processor 1018 may access information from, and store data in, memory that is not physically located on the WTRU 1002, such as on a server or a home computer (not shown).

The processor 1018 may receive power from the power source 1034, and may be configured to distribute and/or control the power to the other components in the WTRU 1002. The power source 1034 may be any suitable device for powering the WTRU 1002. For example, the power source 1034 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1018 may also be coupled to the GPS chipset 1036, which may be configured to provide location information (e.g., longitude and latitude) regarding the current location of the WTRU 1002. In addition to, or in lieu of, the information from the GPS chipset 1036, the WTRU 1002 may receive location information over the air interface 1016 from a base station (e.g., base stations 1014*a*, 1014*b*) and/or determine its location based on the timing of the signals being received from two or more nearby base stations. It will be appreciated that the WTRU 1002 may acquire location information by way of any suitable location-determination method while remaining consistent with an embodiment.

The processor 1018 may further be coupled to other peripherals 1038, which may include one or more software and/or hardware modules that provide additional features, functionality and/or wired or wireless connectivity. For example, the peripherals 1038 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8C:
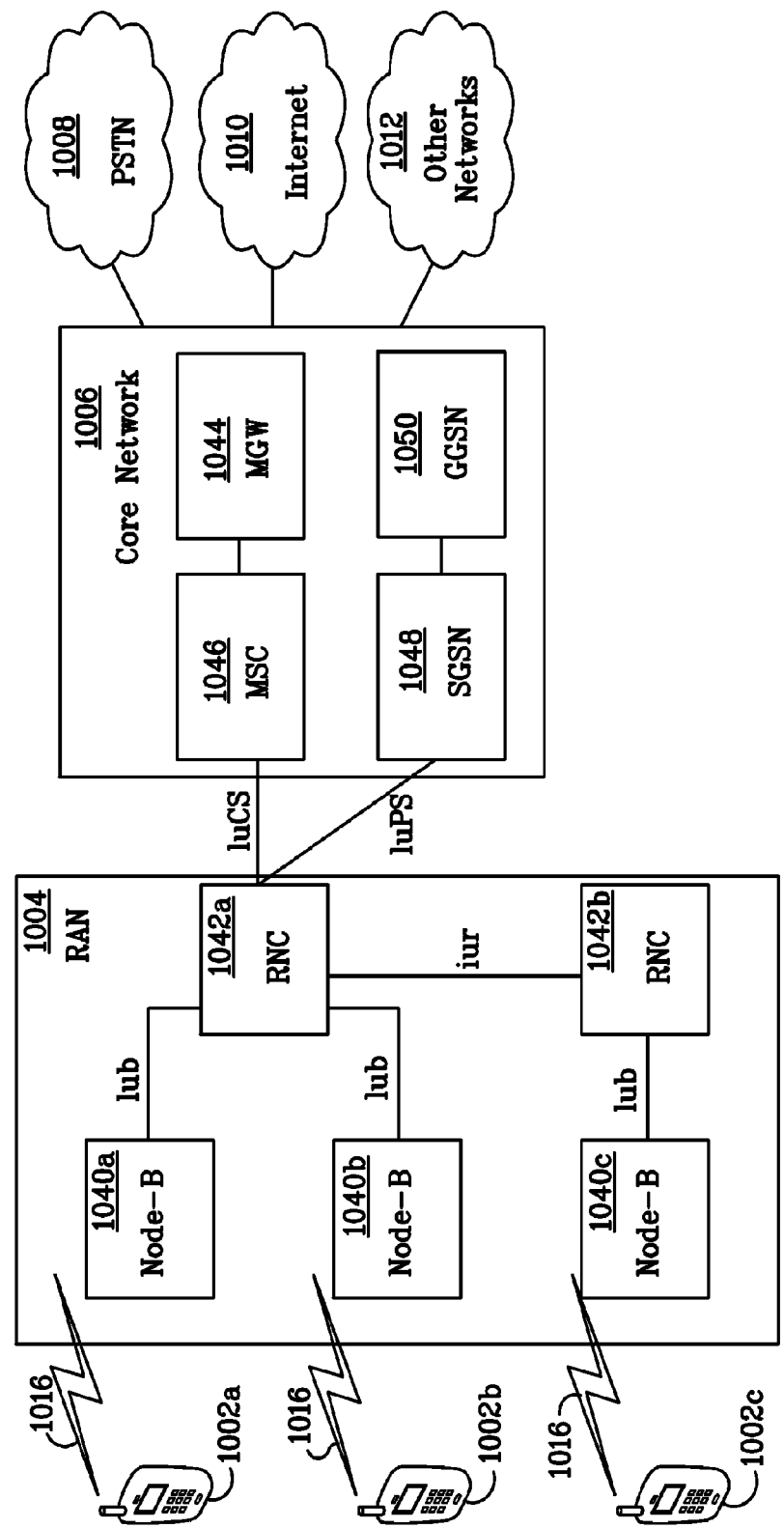
FIG. 8C is a system diagram of an example radio access network and an example core network that may be used within the communications system illustrated in FIG. 8A.

FIG. 8C is a system diagram of the RAN 1004 and the core network 1006 according to an embodiment. As noted above, the RAN 1004 may employ a UTRA radio technology to communicate with the WTRUs 1002*a*, 1002*b*, 1002*c* over the air interface 1016. The RAN 1004 may also be in communication with the core network 1006. As shown in FIG. 8C, the RAN 1004 may include Node-Bs 1040*a*, 1040*b*, 1040*c*, which may each include one or more transceivers for communicating with the WTRUs 1002*a*, 1002*b*, 1002*c* over the air interface 1016. The Node-Bs 1040*a*, 1040*b*, 1040*c* may each be associated with a particular cell (not shown) within the RAN 1004. The RAN 1004 may also include RNCs 1042*a*, 1042*b*. It will be appreciated that the RAN 1004 may include any number of Node-Bs and RNCs while remaining consistent with an embodiment.

As shown in FIG. 8C, the Node-Bs 1040*a*, 1040*b* may be in communication with the RNC 1042*a*. Additionally, the Node-B 1040*c* may be in communication with the RNC 1042*b*. The Node-Bs 1040*a*, 1040*b*, 1040*c* may communicate with the respective RNCs 1042*a*, 1042*b* via an Iub interface. The RNCs 1042*a*, 1042*b* may be in communication with one another via an Iur interface. Each of the RNCs 1042*a*, 1042*b* may be configured to control the respective Node-Bs 1040*a*, 1040*b*, 1040*c* to which it is connected. In addition, each of the RNCs 1042*a*, 1042*b* may be configured to carry out and/or support other functionality, such as outer loop power control, load control, admission control, packet scheduling, handover control, macrodiversity, security functions, data encryption, and the like.

The core network 1006 shown in FIG. 8C may include a media gateway (MGW) 1044, a mobile switching center (MSC) 1046, a serving GPRS support node (SGSN) 1048, and/or a gateway GPRS support node (GGSN) 1050. While each of the foregoing elements are depicted as part of the core network 1006, it will be appreciated that any one of these elements may be owned and/or operated by an entity other than the core network operator.

The RNC 1042*a* in the RAN 1004 may be connected to the MSC 1046 in the core network 1006 via an IuCS interface. The MSC 1046 may be connected to the MGW 1044. The MSC 1046 and the MGW 1044 may provide the WTRUs 1002a, 1002b, 1002c with access to circuit-switched networks, such as the PSTN 1008, to facilitate communications between the WTRUs 1002a, 1002b, 1002c and traditional land-line communications devices.

The RNC 1042a in the RAN 1004 may also be connected to the SGSN 1048 in the core network 1006 via an IuPS interface. The SGSN 1048 may be connected to the GGSN 1050. The SGSN 1048 and the GGSN 1050 may provide the WTRUs 1002a, 1002b, 1002c with access to packet-switched networks, such as the Internet 1010, to facilitate communications between and the WTRUs 1002a, 1002b, 1002c and IP-enabled devices.

As noted above, the core network 1006 may also be connected to the networks 1012, which may include other wired or wireless networks that are owned and/or operated by other service providers.

Although features and elements are described above in particular combinations, each feature or element can be used alone or in any combination with the other features and elements. Additionally, the embodiments described herein are provided for exemplary purposes only. For example, while embodiments may be described herein using OpenID Connect and/or GBA authentication entities and functions, similar embodiments may be implemented using other authentication entities and functions. Furthermore, the embodiments described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by user equipment (UE) in a system comprising the UE a service provider (SP), and an authentication endpoint (AEP), which communicate with each other via a network, the method comprising:
   requesting access to a service that is provided by the SP;
   in response to requesting access to the service, receiving a request for a token;
   receiving a request that the UE use a generic bootstrapping architecture (GBA) protocol for authentication of the UE;
   in response to the request for the token, creating an identity (ID) token; and
   signing the ID token using a token key in accordance with the GBA protocol to create a signature of the ID token,
   wherein the signature is verified to provide the UE access to the service, and the ID token includes a header indicating that the ID token was created locally at the UE.

2. The method of claim 1, the method further comprising:
   deriving the token key from a master session key that is bootstrapped in accordance with the GBA protocol, wherein the token key is an application specific key.

3. The method of claim 1, the method further comprising:
   calculating an authentication digest in accordance with the GBA protocol; and
   using the calculated authentication digest as the token key.

4. The method of claim 1, the method further comprising:
   calculating an application specific key from a master session key that is bootstrapped in accordance with the GBA protocol; and
   when the application specific key is calculated correctly, retrieving the token key from a module that resides within the UE, wherein the token key is a private key with a corresponding public key available to the AEP.

5. The method of claim 4, the method further comprising:
   building a universal resource locator (URL) for the corresponding public key, wherein the signature is verified by retrieving the public key from the URL.

6. The method of claim 1, the method further comprising:
   deriving a first key from a master session key that is bootstrapped in accordance with the GBA protocol, wherein the first key is an application specific key;
   generating a random seed value; and
   deriving a key pair from the application specific key and the random seed value, the key pair including a private key and a public key, wherein the private key is the token key.

7. The method of claim 1, the method further comprising:
   in response to the request for the token, creating an access token comprising information indicative of a location of a user information endpoint, wherein the user information endpoint provides at least one requested user attribute to the SP upon verification of the access token.

8. The method of claim 7, wherein the user information endpoint is located on at least one of the UE or a network entity that communicates with the SP via the network.

9. The method of claim 1, wherein the AEP comprises a network access function (NAF) and an OpenID identity provider that are co-located with each other.

10. A wireless transmit/receive unit (WTRU) comprising:
    a memory comprising executable instructions; and
    a processor in communications with the memory, the instructions, when executed by the processor, cause the processor to effectuate operations comprising:
      requesting access to a service that is provided by the SP;
      in response to requesting access to the service, receiving a request for a token;
      receiving a request that the UE use a generic bootstrapping architecture (GBA) protocol for authentication of the UE;
      in response to the request for the token, creating an identity (ID) token; and
      signing the ID token using a token key in accordance with the GBA protocol to create a signature of the ID token,
    wherein the signature is verified to provide the UE access to the service, and the ID token includes a header indicating that the ID token was created locally at the WTRU.

11. The WTRU as recited in claim 10, wherein the processor is further configured to execute the instructions to perform operations comprising:
    deriving the token key from a master session key that is bootstrapped in accordance with the GBA protocol, wherein the token key is an application specific key.

12. The WTRU as recited in claim 10, wherein the processor is further configured to execute the instructions to perform operations comprising:

calculating an authentication digest in accordance with the GBA protocol; and using the calculated authentication digest as the token key.

13. The WTRU as recited in claim 10, wherein the processor is further configured to execute the instructions to perform operations comprising:

calculating an application specific key from a master session key that is bootstrapped in accordance with the GBA protocol; and when the application specific key is calculated correctly, retrieving the token key from a module that resides within the UE, wherein the token key is a private key with a corresponding public key available to the AEP.

14. The WTRU as recited in claim 13, wherein the processor is further configured to execute the instructions to perform operations comprising:

building a universal resource locator (URL) for the corresponding public key, wherein the signature is verified by retrieving the public key from the URL.

15. The WTRU as recited in claim 10, wherein the processor is further configured to execute the instructions to perform operations comprising:

deriving a first key from a master session key that is bootstrapped in accordance with the GBA protocol, wherein the first key is an application specific key;

generating a random seed value; and deriving a key pair from the application specific key and the random seed value, the key pair including a private key and a public key, wherein the private key is the token key.

16. The WTRU as recited in claim 10, wherein the processor is further configured to execute the instructions to perform operations comprising:

in response to the request for the token, creating an access token comprising information indicative of a location of a user information endpoint, wherein the user information endpoint provides at least one requested user attribute to the SP upon verification of the access token.

17. The WTRU as recited in claim 16, wherein the user information endpoint is located on at least one of the UE or a network entity that communicates with the SP via the network.

18. The WTRU as recited in claim 10, wherein the AEP comprises a network access function (NAF) and an OpenID identity provider that are co-located with each other.

* * * * *